United States Patent
Peng et al.

(10) Patent No.: US 12,412,912 B2
(45) Date of Patent: Sep. 9, 2025

(54) ELECTROCHEMICAL AMINE/NITRILE REDOX METHOD FOR AMBIENT HYDROGEN STORAGE

(71) Applicants: Zhenmeng Peng, Hudson, OH (US); Dezhen Wu, Cuyahoga Falls, OH (US); Jialu Li, Akron, OH (US)

(72) Inventors: Zhenmeng Peng, Hudson, OH (US); Dezhen Wu, Cuyahoga Falls, OH (US); Jialu Li, Akron, OH (US)

( * ) Notice: Subject to any disclaimer, the term of this patent is extended or adjusted under 35 U.S.C. 154(b) by 641 days.

(21) Appl. No.: 17/875,171

(22) Filed: Jul. 27, 2022

(65) Prior Publication Data

US 2023/0034211 A1 Feb. 2, 2023

Related U.S. Application Data

(60) Provisional application No. 63/279,409, filed on Nov. 15, 2021, provisional application No. 63/225,957, filed on Jul. 27, 2021.

(51) Int. Cl.
 *H01M 8/04082* (2016.01)
 *H01M 8/04089* (2016.01)
 *H01M 8/083* (2016.01)
 *H01M 8/2457* (2016.01)

(52) U.S. Cl.
 CPC ... *H01M 8/04216* (2013.01); *H01M 8/04089* (2013.01); *H01M 8/083* (2013.01); *H01M 8/2457* (2016.02); *H01M 2300/0014* (2013.01)

(58) Field of Classification Search
 CPC .......... H01M 8/04216; H01M 8/2457; H01M 8/04089; H01M 8/083; H01M 2300/0014
 See application file for complete search history.

(56) References Cited

U.S. PATENT DOCUMENTS

| | | | | |
|---|---|---|---|---|
| 4,584,069 | A * | 4/1986 | Lessard | C25B 3/25 204/290.01 |
| 5,266,731 | A * | 11/1993 | Ayers | C07C 209/48 564/492 |
| 11,359,295 | B2 * | 6/2022 | Modestino | C25B 9/23 |
| 2005/0002857 | A1 * | 1/2005 | Pez | C01B 3/0015 423/648.1 |

(Continued)

OTHER PUBLICATIONS

"An Electrochemical Ethylamine/Acetonitrile Redox Method for Ambient Hydrogen Storage" Dezhen Wu, Jialu Li, Libo Yao, Rongxuan Xie, and Zhenmeng Peng ACS Applied Materials & Interfaces 2021 13 (46), 55292-55298 (Year: 2021).*

(Continued)

*Primary Examiner* — Matthew J Merkling
(74) *Attorney, Agent, or Firm* — Renner, Kenner, Greive, Bobak Taylor & Weber

(57) ABSTRACT

A method and system for releasably storing hydrogen and generating electricity including an electrochemical cell including a cathode, an anode, an electrolyte, a microporous separator, an electrical connection between the cathode and the anode, an amine source, a nitrile source, a hydrogen source, and an oxygen source, wherein the electrochemical cell is configured to be operated in a hydrogen storage mode, a hydrogen release mode, and electrical generation mode. The amine/nitrile redox couple provides for full cycle electrochemical conversion of hydrogen under mild conditions.

9 Claims, 3 Drawing Sheets

(56) References Cited

U.S. PATENT DOCUMENTS

2014/0134100 A1* 5/2014 Naeemi ............... B01J 19/1893
422/619

OTHER PUBLICATIONS

Dafeng Zhang, Junxiang Chen, Zhongjing Hao, Lei Jiao, Qingfeng Ge, Wen-Fu Fu, Xiao-Jun Lv, Highly efficient electrochemical hydrogenation of acetonitrile to ethylamine for primary amine synthesis and promising hydrogen storage, Chem Catalysis, vol. 1, Issue 2, 2021, 393-406 (Year: 2021).*

* cited by examiner

ELECTROCHEMICAL AMINE/NITRILE REDOX METHOD FOR AMBIENT HYDROGEN STORAGE

CROSS-REFERENCE TO RELATED APPLICATIONS

The present application claims the benefit of U.S. Provisional Patent Application No. 63/225,957, filed on Jul. 27, 2021, and U.S. Provisional Patent Application No. 63/279,409, filed on Nov. 15, 2021 which are incorporated herein in their entirety.

FIELD OF THE INVENTION

The present invention generally relates to hydrogen storage technology and fuel cell technologies.

BACKGROUND OF THE INVENTION

Hydrogen is an appealing energy carrier that can potentially replace conventional fossil fuels in the development of a clean, sustainable hydrogen economy, which would resolve environmental problems caused by the combustion of non-renewable resources while also meeting the rising demand for energy. Hydrogen storage has remained a significant obstacle for the proliferation of hydrogen as a fuel source.

At present, hydrogen is mainly stored in the form of either a compressed gas or a cryogenic liquid. Each of these methods are ill-suited for commercial applications due to insufficient energy storage density. Further, these methods require extreme storage conditions, which leads to an increase in cost and risks.

The U.S. Department of Energy has established a target of onboard hydrogen storage of 5.5 wt. % hydrogen below 85° C. and 12 bar by the year 2025. Previous state-of-the-art solutions fail to achieve this target. Thus, there is a need for improved high-density hydrogen storage methods.

Two paths for development of improved hydrogen storage methods have emerged. Physisorption and chemical conversion methods. Physisorption methods use large-surface area, light-weight storage materials which can weakly adsorb hydrogen molecules to their surface via Van der Waals forces. Promising materials include carbon nanotubes, zeolites, metal organic frameworks (MOFs), and covalent organic frameworks (COFs). These methods and materials have thus far proven to have relatively low storage capacity (less than 2 wt. %).

Chemical conversion methods involve storing hydrogen in materials through hydrogenation reactions and releasing the hydrogen via decomposition reactions. The liquid organic hydrogen carriers (LOHC) have been gaining rising attention owing to their environmental and economic advantages. However, the traditional thermal strategies of LOHC required elevated temperature and pressure. The electrochemical study of reversible hydrogen storage in organic liquid is promising for its compatibility and commodious. Hydrogen-rich organics are selected to serve as the proton donor for hydrogen production. In particular, alcohols, biomass (furfural, 5-hydroxymethylfurfural, and glycerol), N-heterocycles, urea, hydrazine, and ammonia showed a good capability of hydrogen generation in their electroconversion process. But either the dehydrogenation reactions required a higher applied cell potential that cannot avoid oxygen evolution reaction (OER), or the reversible reactions to regenerate these organics for hydrogen storage are thermodynamically unfavorable with a high $\Delta H$. Thus, making them impossible to serve as ideal hydrogen carriers. Other examples of previously studied compounds include aluminum and magnesium hydrides, metal complex hydrides, and amides/imides. None of these compounds have been able to achieve the Department of Energy 2025 target due to exceeding operating conditions and prohibitive costs. Thus, there is a need for a novel chemical conversion method for the releasable storage of hydrogen.

SUMMARY OF THE INVENTION

An embodiment of the present invention provides a method of operating an electrochemical cell to releasably store hydrogen including the electrochemical cell including a cathode, an anode, a microporous separator, an electrolyte, and the method including hydrogenating a nitrile to releasably store hydrogen by feeding hydrogen to the anode, feeding the nitrile to the cathode, and applying a hydrogenation cell voltage to the electrochemical cell such that hydrogen is oxidized via a hydrogen oxidation reaction at the anode and consumed to hydrogenate the nitrile to thereby store the hydrogen in a hydrogenation product amine.

Another embodiment of the present invention provides a method of operating an electrochemical cell to releasably store hydrogen as in any embodiment above, wherein the method further includes dehydrogenating an amine to release hydrogen, wherein the amine may include the hydrogenation product amine and wherein the step of dehydrogenating the amine further including feeding the amine to the anode and applying a dehydrogenation cell voltage to the electrochemical cell such that the amine is converted to a generated nitrile at the anode and hydrogen is released via a hydrogen evolution reaction at the cathode.

Another embodiment of the present invention provides a method of operating an electrochemical cell to releasably store hydrogen as in any embodiment above, wherein operating the electrochemical cell takes place at a temperature of from 0° C. to 100° C.

Another embodiment of the present invention provides a method of operating an electrochemical cell to releasably store hydrogen as in any embodiment above, wherein operating the electrochemical cell takes place at a pressure of from 0.1 bar to 10 bar.

Another embodiment of the present invention provides a method of operating an electrochemical cell to releasably store hydrogen as in any embodiment above, wherein operating the electrochemical cell takes place at ambient conditions.

Another embodiment of the present invention provides a method of operating an electrochemical cell to releasably store hydrogen as in any embodiment above, wherein the hydrogenation cell voltage is between −1 V and 1V.

Another embodiment of the present invention provides a method of operating an electrochemical cell to releasably store hydrogen as in any embodiment above, wherein the dehydrogenation cell voltage is between −1 V and 1V.

Another embodiment of the present invention provides a method of operating an electrochemical cell to releasably store hydrogen as in any embodiment above, wherein the microporous separator is an ion exchange membrane.

Another embodiment of the present invention provides a method of operating an electrochemical cell to releasably store hydrogen as in any embodiment above, wherein the ion exchange membrane includes one of a cation exchange membrane and an anion exchange membrane.

Another embodiment of the present invention provides a method of operating an electrochemical cell to releasably store hydrogen as in any embodiment above, wherein the amine includes methylamine, ethylamine, propylamine, butylamine, and their diamine and triamine derivatives like methanediamine, ethylenediamine, propylenediamine, diethylenetriamine, triethylenetetramine, and 1,1,1-tris(aminomethyl)ethane.

Another embodiment of the present invention provides a method of operating an electrochemical cell to releasably store hydrogen as in any embodiment above, wherein _.

Another embodiment of the present invention provides a method of operating an electrochemical cell to releasably store hydrogen as in any embodiment above, wherein the catalyst includes platinum, palladium, ruthenium, rhodium, copper, cobalt, nickel, platinum-nickel alloy, platinum-copper alloy, platinum-ruthenium alloy, ruthenium oxide, iron oxide, cobalt oxide, manganese oxide, titanium oxide, cerium oxide, zirconium oxide.

Another embodiment of the present invention provides a method of operating an electrochemical cell to releasably store hydrogen as in any embodiment above, wherein the electrolyte is an aqueous electrolyte.

Another embodiment of the present invention provides a method of operating an electrochemical cell to releasably store hydrogen as in any embodiment above, wherein the electrolyte is an alkaline aqueous electrolyte.

Another embodiment of the present invention provides a method of operating an electrochemical cell to releasably store hydrogen as in any embodiment above, wherein the step of feeding hydrogen to the anode includes supplying hydrogen gas to the anode.

Another embodiment of the present invention provides a method of operating an electrochemical cell to releasably store hydrogen as in any embodiment above, wherein the step of feeding the nitrile to the cathode includes introducing the nitrile in form of gas, liquid, or an aqueous solution of the nitrile.

Another embodiment of the present invention provides a method of operating an electrochemical cell to releasably store hydrogen as in any embodiment above, wherein the step of feeding the amine to the anode includes introducing the amine in form of gas, liquid, or an aqueous solution of the amine.

Another embodiment of the present invention provides a method of operating an electrochemical cell to releasably store hydrogen as in any embodiment above, wherein the electrochemical cell is included in a stack of multiple electrochemical cells.

An embodiment of the present invention provides an electrochemical cell system for releasably storing hydrogen including an electrochemical cell including a cathode, an anode spaced apart from the cathode, an electrolyte to support electrochemical reactions at the cathode and the anode, a microporous separator located in between the cathode and the anode, a conductive connection between the cathode and the anode, wherein an electrochemical cell voltage may be applied, a nitrile source, wherein a nitrile contacts the cathode, a hydrogen source, wherein hydrogen contacts the anode, and wherein during a storage operation, hydrogen is oxidized via a hydrogen oxidation reaction at the anode and consumed to hydrogenate the nitrile to thereby store the hydrogen in a hydrogenation product amine.

Another embodiment of the present invention provides an electrochemical cell system as in any embodiment above, wherein the electrochemical cell further includes an amine source, wherein an amine contacts the anode, and wherein during a release operation, hydrogen is released via a hydrogen evolution reaction at the cathode, and a dehydrogenation product nitrile is formed.

Another embodiment of the present invention provides an electrochemical cell system as in any embodiment above, wherein an operating temperature of the electrochemical cell is from 0° C. to 100° C.

Another embodiment of the present invention provides an electrochemical cell system as in any embodiment above, wherein an operating pressure of the electrochemical cell is from 0.1 bar to 10 bar.

Another embodiment of the present invention provides an electrochemical cell system as in any embodiment above, wherein the electrochemical cell is at ambient conditions.

Another embodiment of the present invention provides an electrochemical cell system as in any embodiment above, wherein the electrochemical cell voltage is between −1 V and 1V.

Another embodiment of the present invention provides an electrochemical cell system as in any embodiment above, wherein the microporous separator includes an ion exchange membrane.

Another embodiment of the present invention provides an electrochemical cell system as in any embodiment above, wherein the ion exchange membrane includes one of a cation exchange membrane and an anion exchange membrane.

Another embodiment of the present invention provides an electrochemical cell system as in any embodiment above, wherein the amine includes methylamine, ethylamine, propylamine, butylamine, and their diamine and triamine derivatives like methanediamine, ethylenediamine, propylenediamine, diethylenetriamine, triethylenetetramine, and 1,1,1-tris(aminomethyl)ethane.

Another embodiment of the present invention provides an electrochemical cell system as in any embodiment above, wherein the electrolyte includes an alkaline aqueous electrolyte.

Another embodiment of the present invention provides an electrochemical cell system as in any embodiment above, wherein the nitrile source includes the nitrile in form of gas, liquid, or an aqueous nitrile solution dispersed within the aqueous electrolyte.

Another embodiment of the present invention provides an electrochemical cell system as in any embodiment above, wherein the amine source includes the amine in form of gas, liquid, or an aqueous amine solution dispersed within the aqueous electrolyte.

Another embodiment of the present invention provides an electrochemical cell system as in any embodiment above, including a plurality of the electrochemical cells configured to operate as a stack of electrochemical cells.

An embodiment of the present invention provides a method of operating an electrochemical cell to generate electricity, the electrochemical cell including a cathode, an anode, a microporous separator an aqueous electrolyte including hydroxide ions, and an external circuit, the method including feeding an amine to the anode, feeding an oxygen containing gas to the cathode, generating a cell voltage and a cell current via an anode half-cell reaction and a cathode half-cell reaction, wherein the anode half-cell reaction includes oxidizing amine in the presence of hydroxide ions and producing a nitrile and releasing electrons to transport through the external circuit to the cathode, wherein the cathode half-cell reaction includes reducing oxygen in the presence of water and producing hydroxide ions and accepting electrons.

Another embodiment of the present invention provides a method of operating an electrochemical cell to generate electricity as in any embodiment above, wherein operating the electrochemical cell takes place at a temperature of from 0° C. to 100° C.

Another embodiment of the present invention provides a method of operating an electrochemical cell to generate electricity as in any embodiment above, wherein operating the electrochemical cell takes place at a pressure of from 0.1 bar to 10 bar.

Another embodiment of the present invention provides a method of operating an electrochemical cell to generate electricity as in any embodiment above, wherein operating the electrochemical cell takes place at ambient conditions.

Another embodiment of the present invention provides a method of operating an electrochemical cell to generate electricity as in any embodiment above, wherein the amine includes methylamine, ethylamine, propylamine, butylamine, and their diamine and triamine derivatives like methanediamine, ethylenediamine, propylenediamine, diethylenetriamine, triethylenetetramine, and 1,1,1-tris(aminomethyl)ethane.

Another embodiment of the present invention provides a method of operating an electrochemical cell to generate electricity as in any embodiment above, wherein the aqueous electrolyte is an alkaline aqueous electrolyte.

Another embodiment of the present invention provides a method of operating an electrochemical cell to generate electricity as in any embodiment above, wherein the step of feeding the amine to the anode includes introducing the amine in form of gas, liquid, or an aqueous solution of the amine to the aqueous electrolyte.

Another embodiment of the present invention provides a method of operating an electrochemical cell to generate electricity as in any embodiment above, wherein further including regenerating the nitrile via embodiments of the present invention directed towards storing hydrogen.

An embodiment of the present invention provides an electrochemical cell system for generating electricity, the system including an electrochemical cell including a cathode, an anode spaced apart from the cathode, an aqueous electrolyte to support electrochemical reactions at the cathode and the anode, a microporous separator located between the cathode and anode, a conductive connection between the cathode and the anode, an amine source, arranged such that an amine contacts the anode, an oxygen source, arranged such that oxygen contacts the cathode, wherein during an electrical generation operation, amine is oxidized into a nitrile at the at the anode and oxygen reduction reaction occurs at the cathode to generate a cell voltage and a cell current.

Another embodiment of the present invention provides an electrochemical cell system for generating electricity as in any embodiment above, wherein an operating temperature of the electrochemical cell is from 0° C. to 100° C.

Another embodiment of the present invention provides an electrochemical cell system for generating electricity as in any embodiment above, wherein an operating pressure of the electrochemical cell is from 0.1 bar to 10 bar.

Another embodiment of the present invention provides an electrochemical cell system for generating electricity as in any embodiment above, wherein the electrochemical cell is at ambient conditions.

Another embodiment of the present invention provides an electrochemical cell system for generating electricity as in any embodiment above, wherein microporous separator includes an ion exchange membrane.

Another embodiment of the present invention provides an electrochemical cell system for generating electricity as in any embodiment above, wherein the ion exchange membrane includes an anion exchange membrane.

Another embodiment of the present invention provides an electrochemical cell system for generating electricity as in any embodiment above, wherein the amine includes methylamine, ethylamine, propylamine, butylamine, and their diamine and triamine derivatives like methanediamine, ethylenediamine, propylenediamine, diethylenetriamine, triethylenetetramine, and 1,1,1-tris(aminomethyl)ethane.

Another embodiment of the present invention provides an electrochemical cell system for generating electricity as in any embodiment above, wherein the aqueous electrolyte includes an alkaline aqueous electrolyte.

Another embodiment of the present invention provides an electrochemical cell system for generating electricity as in any embodiment above, including a plurality of the electrochemical cells configured to operate as a stack of electrochemical cells.

DETAILED DESCRIPTION OF ILLUSTRATIVE EMBODIMENTS

Figure 1:
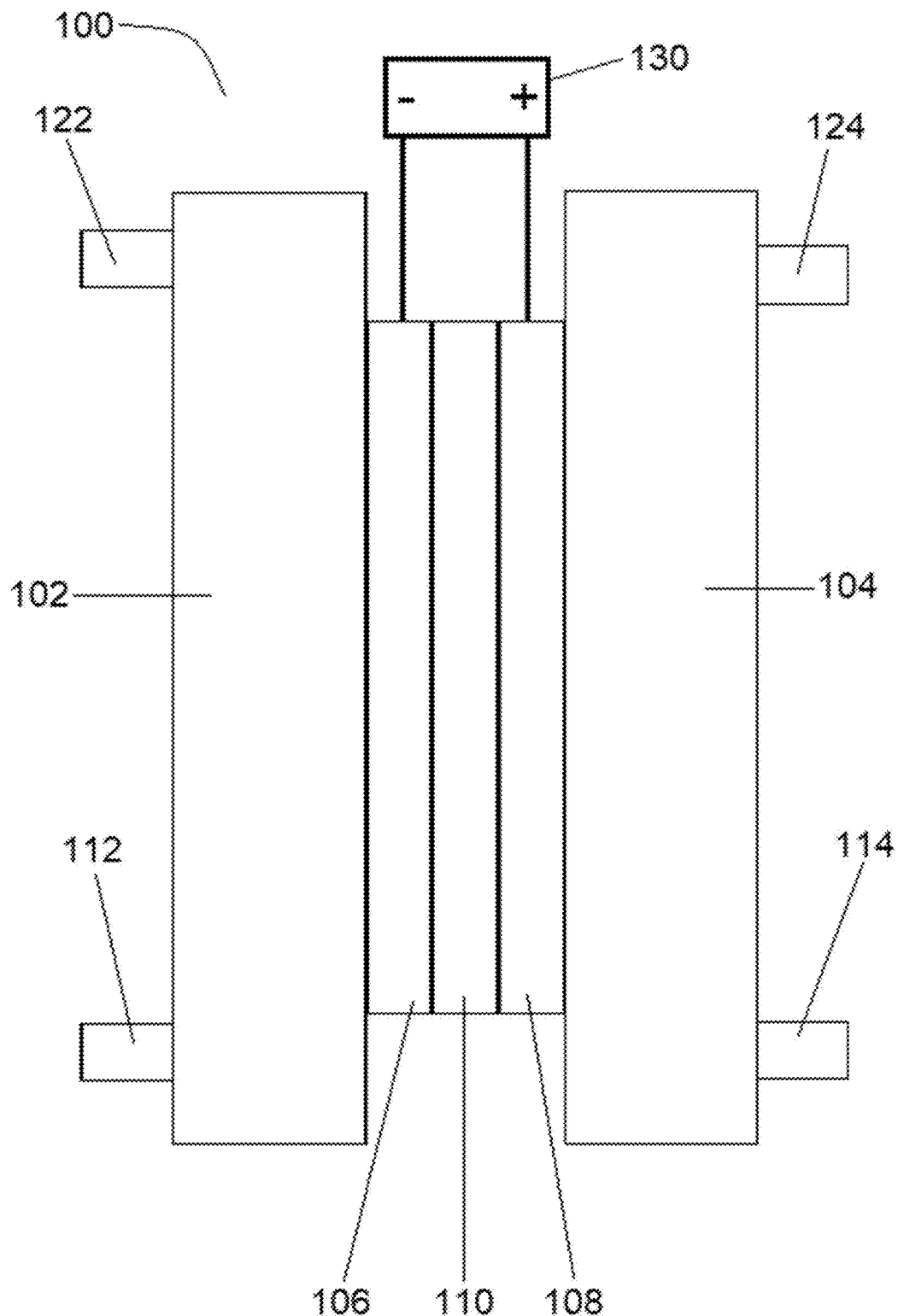
FIG. 1 schematically illustrates an electrochemical cell used in electrochemical conversion according to embodiments of the present invention.

The present invention provides systems and methods for producing and storing hydrogen. The present invention also provides systems and methods for electrochemical cells and energy storage and release.

Advantageously, the present invention relates to amine/nitrile redox couples wherein nitrile is readily converted to a corresponding amine in a reversible process. The reversible process allows for conversion of amine into a corresponding nitrile while releasing useful products including hydrogen or energy. The systems and methods of the present invention include hydrogen oxidation reaction (HOR) coupled with hydrogenation of a nitrile and hydrogen evolution reaction (HER) coupled with dehydrogenation of an amine. The systems and methods of the present invention also include oxygen reduction reaction (ORR) coupled with dehydrogenation of an amine.

Advantageously, the amine/nitrile redox couple possesses moderate chemical polarity and simple hydrogenation and dehydrogenation pathways which improve reaction activation and reduce the energy barrier. As such, embodiments of the present invention can be practiced in mild conditions (e.g., ambient, not harsh conditions such as cryogenic or high temperature/pressure conditions). Thus, embodiments of the present meet or exceed the Department of Energy 2025 Technical System Targets: Onboard Hydrogen Storage for Light-Duty Fuel Cell Vehicles including at least 1.8 kWh/kg (0.055 kg $H_2$/kg system or 5.5 wt. % hydrogen) usable, specific energy from $H_2$ and 1.3 kWh/L (0.040 kg $H_2$/L system) usable energy density from $H_2$ at a storage system cost of 9 dollars/kWh net (300 dollars/kg $H_2$). Further, reactants and products may be stored and supplied under mild conditions, which further simplifies implementation of the present invention in commercial embodiments.

As discussed above, the present invention relates to electrochemical systems and methods involving amine/nitrile redox couples. In some embodiments the amine/nitrile redox couples that can be utilized in the present invention include a range of primary/secondary amines and polyamines and their corresponding nitriles as well as other dehydrogenated molecules. In some embodiments amines that can be used in this invention include, but not limited to, methylamine, ethylamine, propylamine, butylamine, and their diamine and triamine derivatives like methanediamine, ethylenediamine, propylenediamine, diethylenetriamine, triethylenetetramine, and 1,1,1-tris(aminomethyl)ethane. In some embodiments primary amines are most preferred due to their reversible reaction energy efficiency, standard hydrogen gravitational ratio, controllable target products, and safety in handling and storage.

The dehydrogenation product of amine is nitrile. Nitrile is a hydrogen lean organic that serves as a proton acceptor for hydrogen storage. In some embodiments of the present invention nitriles used include acetonitrile and corresponding nitrile dehydrogenation products of the above amines. In some embodiments of the present invention amines and corresponding nitriles include methylamine to formonitrile, ethylamine to acetonitrile, propylamine to propionitrile, butylamine to butanenitrile, methanediamine to aminomethanenitrile, ethylenediamine to ethanedinitrile, propylenediamine to propanedinitrile, diethylenetriamine to diethylenetrinitrile.

In some embodiments of the present invention, electrochemical conversion of amine/nitrile redox couples is performed using an electrochemical cell. In some embodiments, electrochemical cells suitable for practicing the present invention comprise at least two electrodes including one anode and one cathode, and an electrolyte.

Referring to FIG. 1, an electrochemical cell 100 system for electrochemical conversion of amine/nitrile redox couple. Electrochemical cell 100 may include anode region 102 and cathode region 104. Anode region 102 may include anode 106, anode input 112, and anode output 122. Cathode region 104 may include cathode 108, cathode input 114, and cathode output 124. Electrochemical cell 100 may include a microporous separator 110. Electrochemical cell 100 may include a power supply 130 which is electrically connected to anode 106 and cathode 108. The anode 106 and the cathode 108 are spaced apart from each other within the electrochemical cell, each contacting the electrolyte.

In some embodiments the electrodes, including anode 106 and cathode 108, for use in hydrogenation and dehydrogenation are well known in the art. The electrodes must be able to withstand conditions in the electrochemical cell, which may vary depending on the presence of the electrolyte, electrochemical reactants, and electrochemical products. In some embodiments of the systems and methods of the present invention the electrodes may comprise carbon cloth, double-sided carbon cloth with microporous layer (MPL), including CT Carbon Cloth with MPL (microporous layer) available from Fuel Cell Store.

In some embodiments the electrodes, including anode 106 and cathode 108, include a catalyst disposed on the surface of the electrode. Catalyst materials promote the involved electrochemical conversions. In some embodiments, suitable catalyst materials include a range of transition metal and alloy-based and reducible oxide-based materials, including, but not limited to, platinum, palladium, ruthenium, rhodium, copper, cobalt, nickel, platinum-nickel alloy, platinum-copper alloy, platinum-ruthenium alloy, ruthenium oxide, iron oxide, cobalt oxide, manganese oxide, titanium oxide, cerium oxide, zirconium oxide. Catalyst selection impacts the ability for intermediate redox species to form during hydrogenation and dehydrogenation operations. Bimetallic catalysts reduce the chance of intermediates adsorbing to the catalyst surface.

Electrolytes for use with the present invention facilitate ion exchange for electrochemical conversion reactions at the electrodes. In some embodiments of the present invention the electrolyte is an aqueous solution. In some embodiments of the present invention the aqueous electrolyte may have an acidic, neutral, and basic pH. In some embodiments the electrolyte may be a solid-state electrolyte including polymer electrolyte membrane for use between two electrodes. In some embodiments the solid-state electrolyte includes proton exchange membranes (PEM) and alkaline exchange membranes (AEM).

In some embodiments the electrolyte is an aqueous alkaline electrolyte. Suitable aqueous alkaline electrolytes include alkali hydroxides. In some embodiments the aqueous alkaline electrolyte comprises at least one of lithium hydroxide (LiOH), sodium hydroxide (NaOH) and potassium hydroxide (KOH).

In some embodiments the electrolyte is an aqueous acidic electrolyte. In some embodiments the acidic electrolyte includes strong acids and weak acids.

In some embodiments the electrolyte is an aqueous neutral electrolyte. In some embodiments aqueous electrolytes include aqueous solutions of ionic salts.

The concentration of the electrolyte is known to impact performance of the electrochemical cell during operation according to systems and methods of the present invention. Increasing the concentration of the electrolyte enhances the ionic conductivity of the electrochemical cell.

The pH of the electrolyte is understood to affect performance of the electrochemical cell during operation. The pH of the electrolyte may be influenced by the selection of specific electrolytes and the concentration of the chosen electrolytes.

In some embodiments of the present invention the electrolyte is an aqueous alkaline electrolyte with a pH of greater than 7. In some embodiments of the present invention the electrolyte is an aqueous alkaline electrolyte with a pH of greater than 8. In some embodiments of the present invention the electrolyte is an aqueous alkaline electrolyte with a pH of greater than 9. In some embodiments of the present invention the electrolyte is an aqueous alkaline electrolyte with a pH of greater than 10. In some embodiments of the present invention the electrolyte is an aqueous alkaline electrolyte with a pH of greater than 11. In some embodiments of the present invention the electrolyte is an aqueous alkaline electrolyte with a pH of greater than 12. In some embodiments of the present invention the electrolyte is an aqueous alkaline electrolyte with a pH of greater than 13. In some embodiments of the present invention the electrolyte is an aqueous alkaline electrolyte with a pH of 14.

In some embodiments of the present invention the electrolyte is an aqueous alkaline electrolyte with a pH of from 7 to 14. In further embodiments the aqueous alkaline electrolyte has a pH of from 8 to 14. In further embodiments the aqueous alkaline electrolyte has a pH of from 9 to 14. In further embodiments the aqueous alkaline electrolyte has a pH of from 10 to 14. In further embodiments the aqueous alkaline electrolyte has a pH of from 11 to 14. In further embodiments the aqueous alkaline electrolyte has a pH of from 12 to 14. In further embodiments the aqueous alkaline electrolyte has a pH of from 12.5 to 14. In further embodiments the aqueous alkaline electrolyte has a pH of from 13 to 14. In further embodiments the aqueous alkaline electrolyte has a pH of from 13.5 to 14.

In some embodiments, the electrolyte may further include reactants for the electrochemical conversion. In some embodiments the included reactants are in a liquid form. In some embodiments the included reactants are in an aqueous form. In some embodiments the included reactants are in gaseous form. In some embodiments, the electrolyte may include reactants in one or more of liquid, aqueous, and gaseous forms.

In some embodiments microporous separator 110 is located between anode 106 and cathode 108. In some embodiments microporous separator 110 is an ion exchange membrane. An ion exchange membrane, which can be either anion exchange membrane or cation exchange membrane, can be operated under alkaline, neutral, and acidic conditions. In some embodiments where microporous separator 110 is an ion exchange membrane, the catalyst layer is tightly attached on each side of the ion exchange membrane sandwiched by the cathode and anode electrodes on each side of the ion exchange membrane.

In some embodiments of the present invention, electrochemical cells without an ion exchange membrane outperform a comparable cell with an ion exchange membrane through lower energy consumption and a higher electrolysis efficiency. The decrease in performance of cells with an ion exchange membrane is a result of the plasticizing effects on ionically conducting polymer membranes.

In some embodiments of the present invention, the ion exchange membrane comprises an anion exchange membrane. Anion exchange membranes allow for selective transport of anions across the cell junction. In some embodiments, electrochemical cells including an anion exchange membrane may be operated under alkaline conditions. Suitable anion exchange membranes include those commercially available from FuMA-TECH including Fumasep products available from Fuel Cell Store.

In some embodiments of the present invention, the ion exchange membrane comprises a cation exchange membrane. Cation exchange membranes perform as a separator, solid electrolyte, and allow for selective transport of cations across the cell junction. Suitable cation exchange membranes include those commercially available from FuMA-TECH including Fumasep and Fumapem products available from Fuel Cell Store.

During operation of the electrochemical cell for electrochemical conversion of amine/nitrile redox couples a cell voltage is applied to the electrochemical cell. Application of a cell voltage to the electrochemical cell influences the rate of the reactions during operation of the electrochemical cell. This further influences the faradaic efficiency of the amine/nitrile redox couple.

In some embodiments of the present invention power supply 130 is adapted to supply a constant potential, also known as a cell voltage, between the electrodes, including anode 106 and cathode 108 of electrochemical cell 110. In some embodiments of the present invention the power supply is configured to supply a cell voltage of, for example, up to 2.0 V. In other embodiments, the power supply is adapted to supply a cell voltage of about 1.0 V. In other embodiments, the power supply is adapted to supply a cell voltage of about 0.9 V. In other embodiments, the power supply is adapted to supply a cell voltage of about 0.8 V. In other embodiments, the power supply is adapted to supply a cell voltage of about 0.7 V. In other embodiments, the power supply is adapted to supply a cell voltage of about 0.6 V. In other embodiments, the power supply is adapted to supply a cell voltage of about 0.5 V. In other embodiments, the power supply is adapted to supply a cell voltage of about 0.4 V. In other embodiments, the power supply is adapted to supply a cell voltage of about 0.3 V. In other embodiments, the power supply is adapted to supply a cell voltage of about 0.2 V. In other embodiments, the power supply is adapted to supply a cell voltage of about 0.1 V. The power supply may be reversible as required. The electrochemical cell may further comprise a detector for monitoring current. The electrochemical cell may further comprise a controller for controlling the power supply and timing of the cell voltage. In some embodiments the power supply is configured to apply a hydrogenation cell voltage, a dehydrogenation voltage, and a generation voltage. In some embodiments during operation of the electrochemical cell, the electrochemical cell voltage may be reversed in order to remove unwanted intermediate reaction products that may have adsorbed to the active sites of the electrodes.

The system and methods of operating an electrochemical cell in accordance with the present invention includes supplying reactants to the electrochemical cell. In some embodiments the electrochemical cell includes input ports wherein reactants may be input to the electrochemical cell. The input ports are disposed on the electrochemical cell such that reactants may be supplied directly to the electrodes including the anode and the cathode. Further, the input ports may be configured according to the type of reactant to be fed into the cell, including the state of matter of the reactant. As shown in FIG. 1, anode input 112 and cathode input 114 are configured such that reactants may enter electrochemical cell 100 and contact anode 106 and cathode 108 during operation of electrochemical cell 100. In some embodiments, anode input 112 and cathode input 114 are configured to receive reactants in the forms described above from external sources.

The system and methods of operating an electrochemical cell in accordance with the present invention includes storing reaction products formed through electrochemical conversion of the reactants within the electrochemical cell. In some embodiments the electrochemical cell includes output ports wherein reaction products may be removed from the electrochemical cell. The output ports are disposed on the electrochemical cell such that the output ports allow for products formed at the electrodes, including the anode and the cathode, to readily be removed from the electrochemical cell. Further, the output ports may be configured according to the type of product to be collected, including the state of matter of the product. As shown in FIG. 1, anode output 122 and cathode output 124 are configured such that products are removed from electrochemical cell 100 after electrochemical conversion of the reactants. Anode output 122 and cathode output 124 are configured to supply products in the forms above described above for external storage.

In some embodiments, prior to operation of the electrochemical cell 100 system, the electrochemical cell 100 should be purged of oxygen to prevent unwanted oxygen evolution reactions (OER) or oxygen reduction reactions (ORR). Purging may be performed according to known techniques including those using nitrogen or noble gases such as argon. In some embodiments, purging the electrochemical cell 100 includes using the anode input 112, anode output 122, cathode input 114, and cathode output 124 to remove oxygen.

The electrochemical cell in accordance with the present invention may be operated as one of a plurality of electrochemical cells within a stack of electrochemical cells. In some embodiments of the present invention, a stack of electrochemical cells comprises a plurality of electrochemical cells that may be operated as a stack or individually for electrochemical conversion operations.

The system and methods of the present invention provide for the operation of an electrochemical cell to releasably store hydrogen via amine/nitrile redox couples. In some embodiments electrochemical cell 100 is operable for releasably storing hydrogen via hydrogenation of nitrile coupled with hydrogen oxidation reaction (HOR), according to systems and methods of the present invention. In some embodiments electrochemical cell 100 is operable for releasing stored hydrogen via dehydrogenation of amine coupled with hydrogen evolution reaction (HER). In some embodiments electrochemical cell 100 is operable for generating electrical energy from stored hydrogen via oxidizing amine in the presence of hydroxide ions to produce nitrile and releasing electrons for transport through an external circuit coupled with reducing water in the presence of oxygen to produce hydroxide ions and releasing electrons. For each of these operations, the electrochemical cell is operated at a temperature and pressure, in addition to other parameters.

In embodiments of the present invention relating to operating an electrochemical cell, the electrochemical cell may be operated at a temperature of 0° C. In further embodiments, the electrochemical cell may be operated at a temperature of greater than 0° C. In further embodiments, the electrochemical cell may be operated at a temperature of greater than 10° C. In further embodiments, the electrochemical cell may be operated at a temperature of greater than 20° C. In further embodiments, the electrochemical cell may be operated at a temperature of greater than 30° C. In further embodiments, the electrochemical cell may be operated at a temperature of greater than 40° C. In further embodiments, the electrochemical cell may be operated at a temperature of greater than 50° C. In further embodiments, the electrochemical cell may be operated at a temperature of greater than 60° C. In further embodiments, the electrochemical cell may be operated at a temperature of greater than 70° C. In further embodiments, the electrochemical cell may be operated at a temperature of greater than 80° C. In further embodiments, the electrochemical cell may be operated at a temperature of greater than 90° C. In further embodiments, the electrochemical cell may be operated at a temperature of 100° C.

In embodiments of the present invention relating to operating an electrochemical cell, the electrochemical cell may be operated at a temperature of less than 100° C. In further embodiments, the electrochemical cell may be operated at a temperature of less than 90° C. In further embodiments, the electrochemical cell may be operated at a temperature of less than 80° C. In further embodiments, the electrochemical cell may be operated at a temperature of less than 70° C. In further embodiments, the electrochemical cell may be operated at a temperature of less than 60° C. In further embodiments, the electrochemical cell may be operated at a temperature of less than 50° C. In further embodiments, the electrochemical cell may be operated at a temperature of less than 40° C. In further embodiments, the electrochemical cell may be operated at a temperature of less than 40° C. In further embodiments, the electrochemical cell may be operated at a temperature of less than 30° C. In further embodiments, the electrochemical cell may be operated at a temperature of less than 20° C. In further embodiments, the electrochemical cell may be operated at a temperature of less than 10° C.

In embodiments of the present invention relating to operating an electrochemical cell, the electrochemical cell may be operated at a temperature of from 0° C. to 100° C. In further embodiments, the electrochemical cell may be operated at a temperature of from greater than 0° C. to less than 100° C. In further embodiments, the electrochemical cell may be operated at a temperature of from greater than 5° C. to less than 95° C. In further embodiments, the electrochemical cell may be operated at a temperature of from greater than 10° C. to less than 90° C. In further embodiments, the electrochemical cell may be operated at a temperature of from greater than 15° C. to less than 85° C. In further embodiments, the electrochemical cell may be operated at a temperature of from greater than 20° C. to less than 80° C. In further embodiments, the electrochemical cell may be operated at a temperature of from greater than 25° C. to less than 75° C. In further embodiments, the electrochemical cell may be operated at a temperature of from greater than 30° C. to less than 70° C. In further embodiments, the electrochemical cell may be operated at a temperature of from greater than 35° C. to less than 65° C. In further embodiments, the electrochemical cell may be operated at a temperature of from greater than 40° C. to less than 60° C. In further embodiments, the electrochemical cell may be operated at a temperature of from greater than 45° C. to less than 55° C.

In embodiments of the present invention relating to operating an electrochemical cell, the electrochemical cell may be operated at a pressure of 0.1 bar. In further embodiments, the electrochemical cell may be operated at a pressure of greater than 0.1 bar. In further embodiments, the electrochemical cell may be operated at a pressure of greater than 0.2 bar. In further embodiments, the electrochemical cell may be operated at a pressure of greater than 0.3 bar. In further embodiments, the electrochemical cell may be operated at a pressure of greater than 0.4 bar. In further embodiments, the electrochemical cell may be operated at a pressure of greater than 0.5 bar. In further embodiments, the electrochemical cell may be operated at a pressure of greater than 0.6 bar. In further embodiments, the electrochemical cell may be operated at a pressure of greater than 0.7 bar. In further embodiments, the electrochemical cell may be operated at a pressure of greater than 0.8 bar. In further embodiments, the electrochemical cell may be operated at a pressure of greater than 0.9 bar. In further embodiments, the electrochemical cell may be operated at a pressure of greater than 1.0 bar. In further embodiments, the electrochemical cell may be operated at a pressure of greater than 1.1 bar. In further embodiments, the electrochemical cell may be operated at a pressure of greater than 1.2 bar. In further embodiments, the electrochemical cell may be operated at a pressure of greater than 1.3 bar. In further embodiments, the electrochemical cell may be operated at a pressure of greater than 1.4 bar. In further embodiments, the electrochemical cell may be operated at a pressure of greater than 1.5 bar. In further embodiments, the electrochemical cell may be operated at a pressure of greater than 2.0 bar. In further embodiments, the electrochemical cell may be operated at a pressure of greater than 3.0 bar. In further embodiments, the electrochemical cell may be operated at a pressure of greater than 4.0 bar. In further embodiments, the electrochemical cell may be operated at a pressure of greater than 5.0 bar. In further embodiments, the electrochemical cell may be operated at a pressure of greater than 6.0 bar. In further embodiments, the electrochemical cell may be operated at a pressure of greater than 7.0 bar. In further embodiments, the electrochemical cell may be operated at a pressure of greater than 8.0 bar. In further embodiments, the electrochemical cell may be operated at a pressure of greater than 9.0 bar. In further embodiments, the electrochemical cell may be operated at a pressure of 10 bar.

In embodiments of the present invention relating to operating an electrochemical cell, the electrochemical cell may be operated at a pressure of less than 10 bar. In further embodiments, the electrochemical cell may be operated at a pressure less than 9 bar. In further embodiments, the electrochemical cell may be operated at a pressure less than 8 bar. In further embodiments, the electrochemical cell may be operated at a pressure less than 7 bar. In further embodiments, the electrochemical cell may be operated at a pressure less than 6 bar. In further embodiments, the electrochemical cell may be operated at a pressure less than 5 bar. In further embodiments, the electrochemical cell may be operated at a pressure less than 4 bar. In further embodiments, the electrochemical cell may be operated at a pressure less than 3 bar. In further embodiments, the electrochemical cell may be operated at a pressure less than 2 bar. In further embodiments, the electrochemical cell may be operated at a pressure less than 1.5 bar. In further embodiments, the electrochemical cell may be operated at a pressure less than 1.4 bar. In further embodiments, the electrochemical cell may be operated at a pressure less than 1.3 bar. In further embodiments, the electrochemical cell may be operated at a pressure less than 1.2 bar. In further embodiments, the electrochemical cell may be operated at a pressure less than 1.1 bar. In further embodiments, the electrochemical cell may be operated at a pressure less than 1.0 bar. In further embodiments, the electrochemical cell may be operated at a pressure less than 0.9 bar. In further embodiments, the electrochemical cell may be operated at a pressure less than 0.8 bar. In further embodiments, the electrochemical cell may be operated at a pressure less than 0.7 bar. In further embodiments, the electrochemical cell may be operated at a pressure less than 0.6 bar. In further embodiments, the electrochemical cell may be operated at a pressure less than 0.5 bar. In further embodiments, the electrochemical cell may be operated at a pressure less than 0.4 bar. In further embodiments, the electrochemical cell may be operated at a pressure less than 0.3 bar. In further embodiments, the electrochemical cell may be operated at a pressure less than 0.2 bar.

In embodiments of the present invention relating to operating an electrochemical cell, the electrochemical cell may be operated at a pressure of from 0.1 bar to 10 bar. In further embodiments, the electrochemical cell may be operated at a pressure of from 0.2 to 10 bar. In further embodiments, the electrochemical cell may be operated at a pressure of from 0.3 to 10 bar. In further embodiments, the electrochemical cell may be operated at a pressure of from 0.4 to 10 bar. In further embodiments, the electrochemical cell may be operated at a pressure of from 0.5 to 10 bar. In further embodiments, the electrochemical cell may be operated at a pressure of from 0.2 to 10 bar. In further embodiments, the electrochemical cell may be operated at a pressure of from 0.2 to 10 bar. In further embodiments, the electrochemical cell may be operated at a pressure of from 0.6 to 10 bar. In further embodiments, the electrochemical cell may be operated at a pressure of from 0.7 to 10 bar. In further embodiments, the electrochemical cell may be operated at a pressure of from 0.8 to 10 bar. In further embodiments, the electrochemical cell may be operated at a pressure of from 0.9 to 10 bar. In further embodiments, the electrochemical cell may be operated at a pressure of from 1.0 to 10 bar. In further embodiments, the electrochemical cell may be operated at a pressure of from 1.0 to 9 bar. In further embodiments, the electrochemical cell may be operated at a pressure of from 1.0 to 8 bar. In further embodiments, the electrochemical cell may be operated at a pressure of from 1.0 to 7 bar. In further embodiments, the electrochemical cell may be operated at a pressure of from 1.0 to 6 bar. In further embodiments, the electrochemical cell may be operated at a pressure of from 1.0 to 5 bar. In further embodiments, the electrochemical cell may be operated at a pressure of from 1.1 to 5 bar. In further embodiments, the electrochemical cell may be operated at a pressure of from 1.2 to 5 bar. In further embodiments, the electrochemical cell may be operated at a pressure of from 1.3 to 5 bar. In further embodiments, the electrochemical cell may be operated at a pressure of from 1.4 to 5 bar. In further embodiments, the electrochemical cell may be operated at a pressure of from 1.5 to 5 bar. In further embodiments, the electrochemical cell may be operated at a pressure of from 1.5 to 4 bar. In further embodiments, the electrochemical cell may be operated at a pressure of from 1.5 to 3 bar. In further embodiments, the electrochemical cell may be operated at a pressure of from 1.5 to 2 bar.

The systems and methods of the present invention include embodiments for hydrogenating a nitrile into a corresponding amine coupled with hydrogen oxidation reaction through electrochemical conversion using an electrochemical cell, which stores hydrogen in the corresponding amine.

In embodiments of the present invention for a system and method of hydrogenating a nitrile into a corresponding amine, also known as a storage operation, the system includes an electrochemical cell including a cathode, an anode spaced apart from the cathode, an electrolyte to support electrochemical reactions at the cathode and the anode, a microporous separator located between the anode and the cathode, a conductive connection which electrically connects the cathode and the anode to a power supply, wherein the electrochemical cell voltage may be applied, a nitrile source configured to allow nitrile to contact the cathode, and a hydrogen source configured to allow hydrogen to contact the anode. During the storage operation hydrogen is oxidized via a hydrogen oxidation reaction at the anode and consumed to hydrogenate the nitrile to store in the hydrogen in a hydrogenation product amine.

In embodiments of the present invention relating to a storage operation of hydrogen, the nitrile source is an aqueous nitrile. In such embodiments, the nitrile source may include combining the aqueous nitrile with an aqueous electrolyte of the electrochemical cell.

In embodiments where the nitrile source is an aqueous nitrile, the concentration of the aqueous nitrile is greater than 0.1 M. In further embodiments, the concentration of the aqueous nitrile is greater than 0.2 M. In further embodiments, the concentration of the aqueous nitrile is greater than 0.3 M. In further embodiments, the concentration of the aqueous nitrile is greater than 0.4 M. In further embodiments, the concentration of the aqueous nitrile is greater than 0.5 M. In further embodiments, the concentration of the aqueous nitrile is greater than 0.6 M. In further embodiments, the concentration of the aqueous nitrile is greater than 0.7 M. In further embodiments, the concentration of the aqueous nitrile is greater than 0.8 M. In further embodiments, the concentration of the aqueous nitrile is greater than 0.9 M. In further embodiments, the concentration of the aqueous nitrile is greater than 1.0 M. In further embodiments, the concentration of the aqueous nitrile is greater than 1.1 M. In further embodiments, the concentration of the aqueous nitrile is greater than 1.2 M. In further embodiments, the concentration of the aqueous nitrile is greater than 1.3 M. In further embodiments, the concentration of the aqueous nitrile is greater than 1.4 M. In further embodiments, the concentration of the aqueous nitrile is greater than 1.5 M. In further embodiments, the concentration of the aqueous nitrile is greater than 1.6 M. In further embodiments, the concentration of the aqueous nitrile is greater than 1.7 M. In further embodiments, the concentration of the aqueous nitrile is greater than 1.8 M. In further embodiments, the concentration of the aqueous nitrile is greater than 1.9 M. In further embodiments, the concentration of the aqueous nitrile is greater than 2.0 M. In further embodiments, the concentration of the aqueous nitrile is greater than 3.0 M. In further embodiments, the concentration of the aqueous nitrile is greater than 4.0 M. In further embodiments, the concentration of the aqueous nitrile is greater than 5.0 M. In further embodiments, the concentration of the aqueous nitrile is greater than 6.0 M.

In embodiments where the nitrile source is an aqueous nitrile, the concentration of the aqueous nitrile is less than 6.0 M. In further embodiments, the concentration of the aqueous nitrile is less than 5.0 M. In further embodiments, the concentration of the aqueous nitrile is less than 4.0 M. In further embodiments, the concentration of the aqueous nitrile is less than 3.0 M. In further embodiments, the concentration of the aqueous nitrile is less than 2.0 M. In further embodiments, the concentration of the aqueous nitrile is less than 1.9 M. In further embodiments, the concentration of the aqueous nitrile is less than 1.8 M. In further embodiments, the concentration of the aqueous nitrile is less than 1.7 M. In further embodiments, the concentration of the aqueous nitrile is less than 1.6 M. In further embodiments, the concentration of the aqueous nitrile is less than 1.5 M. In further embodiments, the concentration of the aqueous nitrile is less than 1.4 M. In further embodiments, the concentration of the aqueous nitrile is less than 1.3 M. In further embodiments, the concentration of the aqueous nitrile is less than 1.2 M. In further embodiments, the concentration of the aqueous nitrile is less than 1.1 M. In further embodiments, the concentration of the aqueous nitrile is less than 1.0 M. In further embodiments, the concentration of the aqueous nitrile is less than 0.9 M. In further embodiments, the concentration of the aqueous nitrile is less than 0.8 M. In further embodiments, the concentration of the aqueous nitrile is less than 0.7 M. In further embodiments, the concentration of the aqueous nitrile is less than 0.6 M. In further embodiments, the concentration of the aqueous nitrile is less than 0.5 M. In further embodiments, the concentration of the aqueous nitrile is less than 0.4 M. In further embodiments, the concentration of the aqueous nitrile is less than 0.3 M. In further embodiments, the concentration of the aqueous nitrile is less than 0.2 M. In further embodiments, the concentration of the aqueous nitrile is less than 0.1 M.

In embodiments of the present invention relating to a storage operation of hydrogen, the hydrogen is supplied to the cell to saturate the electrolyte.

Increasing the pH of the electrolyte improves performance of the electrochemical cell during hydrogen storage operation.

In embodiments of the present invention relating to a storage operation of hydrogen, the concentration of the hydroxide-containing electrolyte is greater than 0.1 M. In further embodiments the concentration of the hydroxide-containing electrolyte is greater than 0.2 M. In further embodiments the concentration of the hydroxide-containing electrolyte is greater than 0.3 M. In further embodiments the concentration of the hydroxide-containing electrolyte is greater than 0.4 M. In further embodiments the concentration of the hydroxide-containing electrolyte is greater than 0.5 M. In further embodiments the concentration of the hydroxide-containing electrolyte is greater than 0.6 M. In further embodiments the concentration of the hydroxide-containing electrolyte is greater than 0.7 M. In further embodiments the concentration of the hydroxide-containing electrolyte is greater than 0.8 M. In further embodiments the concentration of the hydroxide-containing electrolyte is greater than 0.9 M. In further embodiments the concentration of the hydroxide-containing electrolyte is greater than 1.0 M. In further embodiments the concentration of the hydroxide-containing electrolyte is greater than 1.1 M. In further embodiments the concentration of the hydroxide-containing electrolyte is greater than 1.2 M. In further embodiments the concentration of the hydroxide-containing electrolyte is greater than 1.3 M. In further embodiments the concentration of the hydroxide-containing electrolyte is greater than 1.4 M. In further embodiments the concentration of the hydroxide-containing electrolyte is greater than 1.5 M. In further embodiments the concentration of the hydroxide-containing electrolyte is greater than 1.6 M. In further embodiments the concentration of the hydroxide-containing electrolyte is greater than 1.7 M. In further embodiments the concentration of the hydroxide-containing electrolyte is greater than 1.8 M. In further embodiments the concentration of the hydroxide-containing electrolyte is greater than 1.9 M. In further embodiments the concentration of the hydroxide-containing electrolyte is greater than 2.0 M.

In embodiments of the present invention relating to a storage operation of hydrogen, the concentration of the hydroxide-containing electrolyte is less than 2.0 M. In further embodiments the concentration of the hydroxide-containing electrolyte is less than 1.9 M. In further embodiments the concentration of the hydroxide-containing electrolyte is less than 1.8 M. In further embodiments the concentration of the hydroxide-containing electrolyte is less than 1.7 M. In further embodiments the concentration of the hydroxide-containing electrolyte is less than 1.6 M. In further embodiments the concentration of the hydroxide-containing electrolyte is less than 1.5 M. In further embodiments the concentration of the hydroxide-containing electrolyte is less than 1.4 M. In further embodiments the concentration of the hydroxide-containing electrolyte is less than 1.3 M. In further embodiments the concentration of the hydroxide-containing electrolyte is less than 1.2 M. In further embodiments the concentration of the hydroxide-containing electrolyte is less than 1.1 M. In further embodiments the concentration of the hydroxide-containing electrolyte is less than 1.0 M. In further embodiments the concentration of the hydroxide-containing electrolyte is less than 0.9 M. In further embodiments the concentration of the hydroxide-containing electrolyte is less than 0.8 M. In further embodiments the concentration of the hydroxide-containing electrolyte is less than 0.7 M. In further embodiments the concentration of the hydroxide-containing electrolyte is less than 0.6 M. In further embodiments the concentration of the hydroxide-containing electrolyte is less than 0.5 M. In further embodiments the concentration of the hydroxide-containing electrolyte is less than 0.4 M. In further embodiments the concentration of the hydroxide-containing electrolyte is less than 0.3 M. In further embodiments the concentration of the hydroxide-containing electrolyte is less than 0.2 M. In further embodiments the concentration of the hydroxide-containing electrolyte is less than 0.1 M.

In some embodiments increasing the hydrogenation cell voltage improves hydrogen uptake into the corresponding amine product, including an increase in the amine production rate. Increasing electrochemical cell voltage corresponds with an increase in Faradaic efficiency of at least 60%.

The systems and methods of the present invention include embodiments for dehydrogenating an amine into a corresponding nitrile coupled with hydrogen evolution reaction through electrochemical conversion using an electrochemical cell, which releases hydrogen from the amine.

In embodiments of the present invention for a system and method of dehydrogenating an amine into a corresponding nitrile, also known as a release operation, the system includes an electrochemical cell including a cathode, an anode spaced apart from the cathode, an electrolyte to support electrochemical reactions at the cathode and the anode, a microporous separator located between the anode and the cathode, a conductive connection which electrically connects the cathode and the anode to a power supply, wherein a dehydrogenation cell voltage, may be applied, an amine source configured to allow amine to contact the anode. During the release operation amine is dehydrogenated into a corresponding nitrile at the anode, and hydrogen is released via a hydrogen evolution reaction at the cathode.

In embodiments of the present invention relating to a storage operation of hydrogen, the amine source is an aqueous amine. In such embodiments, the amine source may include combining the aqueous amine with an aqueous electrolyte of the electrochemical cell.

In embodiments where the amine source is an aqueous amine, the concentration of the aqueous amine is greater than 0.1 M. In further embodiments, the concentration of the aqueous amine is greater than 0.2 M. In further embodiments, the concentration of the aqueous amine is greater than 0.3 M. In further embodiments, the concentration of the aqueous amine is greater than 0.4 M. In further embodiments, the concentration of the aqueous amine is greater than 0.5 M. In further embodiments, the concentration of the aqueous amine is greater than 0.6 M. In further embodiments, the concentration of the aqueous amine is greater than 0.7 M. In further embodiments, the concentration of the aqueous amine is greater than 0.8 M. In further embodiments, the concentration of the aqueous amine is greater than 0.9 M. In further embodiments, the concentration of the aqueous amine is greater than 1.0 M. In further embodiments, the concentration of the aqueous amine is greater than 1.1 M. In further embodiments, the concentration of the aqueous amine is greater than 1.2 M. In further embodiments, the concentration of the aqueous amine is greater than 1.3 M. In further embodiments, the concentration of the aqueous amine is greater than 1.4 M. In further embodiments, the concentration of the aqueous amine is greater than 1.5 M. In further embodiments, the concentration of the aqueous amine is greater than 1.6 M. In further embodiments, the concentration of the aqueous amine is greater than 1.7 M. In further embodiments, the concentration of the aqueous amine is greater than 1.8 M. In further embodiments, the concentration of the aqueous amine is greater than 1.9 M. In further embodiments, the concentration of the aqueous amine is greater than 2.0 M. In further embodiments, the concentration of the aqueous amine is greater than 3.0 M. In further embodiments, the concentration of the aqueous amine is greater than 4.0 M. In further embodiments, the concentration of the aqueous amine is greater than 5.0 M. In further embodiments, the concentration of the aqueous amine is greater than 6.0 M.

In embodiments where the amine source is an aqueous amine, the concentration of the aqueous amine is less than 6.0 M. In further embodiments, the concentration of the aqueous amine is less than 5.0 M. In further embodiments, the concentration of the aqueous amine is less than 4.0 M. In further embodiments, the concentration of the aqueous amine is less than 3.0 M. In further embodiments, the concentration of the aqueous amine is less than 2.0 M. In further embodiments, the concentration of the aqueous amine is less than 1.9 M. In further embodiments, the concentration of the aqueous amine is less than 1.8 M. In further embodiments, the concentration of the aqueous amine is less than 1.7 M. In further embodiments, the concentration of the aqueous amine is less than 1.6 M. In further embodiments, the concentration of the aqueous amine is less than 1.5 M. In further embodiments, the concentration of the aqueous amine is less than 1.4 M. In further embodiments, the concentration of the aqueous amine is less than 1.3 M. In further embodiments, the concentration of the aqueous amine is less than 1.2 M. In further embodiments, the concentration of the aqueous amine is less than 1.1 M. In further embodiments, the concentration of the aqueous amine is less than 1.0 M. In further embodiments, the concentration of the aqueous amine is less than 0.9 M. In further embodiments, the concentration of the aqueous amine is less than 0.8 M. In further embodiments, the concentration of the aqueous amine is less than 0.7 M. In further embodiments, the concentration of the aqueous amine is less than 0.6 M. In further embodiments, the concentration of the aqueous amine is less than 0.5 M. In further embodiments, the concentration of the aqueous amine is less than 0.4 M. In further embodiments, the concentration of the aqueous amine is less than 0.3 M. In further embodiments, the concentration of the aqueous amine is less than 0.2 M. In further embodiments, the concentration of the aqueous amine is less than 0.1 M.

Increasing the pH of the electrolyte improves performance of the electrochemical cell during hydrogen release operation. The pH of the electrolyte may be adjusted by changing the concentration of the electrolyte.

In embodiments of the present invention relating to a release operation of hydrogen, the concentration of the hydroxide-containing electrolyte is greater than 0.1 M. In further embodiments the concentration of the hydroxide-containing electrolyte is greater than 0.2 M. In further embodiments the concentration of the hydroxide-containing electrolyte is greater than 0.3 M. In further embodiments the concentration of the hydroxide-containing electrolyte is greater than 0.4 M. In further embodiments the concentration of the hydroxide-containing electrolyte is greater than 0.5 M. In further embodiments the concentration of the hydroxide-containing electrolyte is greater than 0.6 M. In further embodiments the concentration of the hydroxide-containing electrolyte is greater than 0.7 M. In further embodiments the concentration of the hydroxide-containing electrolyte is greater than 0.8 M. In further embodiments the concentration of the hydroxide-containing electrolyte is greater than 0.9 M. In further embodiments the concentration of the hydroxide-containing electrolyte is greater than 1.0 M. In further embodiments the concentration of the hydroxide-containing electrolyte is greater than 1.1 M. In further embodiments the concentration of the hydroxide-containing electrolyte is greater than 1.2 M. In further embodiments the concentration of the hydroxide-containing electrolyte is greater than 1.3 M. In further embodiments the concentration of the hydroxide-containing electrolyte is greater than 1.4 M. In further embodiments the concentration of the hydroxide-containing electrolyte is greater than 1.5 M. In further embodiments the concentration of the hydroxide-containing electrolyte is greater than 1.6 M. In further embodiments the concentration of the hydroxide-containing electrolyte is greater than 1.7 M. In further embodiments the concentration of the hydroxide-containing electrolyte is greater than 1.8 M. In further embodiments the concentration of the hydroxide-containing electrolyte is greater than 1.9 M. In further embodiments the concentration of the hydroxide-containing electrolyte is greater than 2.0 M.

In embodiments of the present invention relating to a release operation of hydrogen, the concentration of the hydroxide-containing electrolyte is less than 2.0 M. In further embodiments the concentration of the hydroxide-containing electrolyte is less than 1.9 M. In further embodiments the concentration of the hydroxide-containing electrolyte is less than 1.8 M. In further embodiments the concentration of the hydroxide-containing electrolyte is less than 1.7 M. In further embodiments the concentration of the hydroxide-containing electrolyte is less than 1.6 M. In further embodiments the concentration of the hydroxide-containing electrolyte is less than 1.5 M. In further embodiments the concentration of the hydroxide-containing electrolyte is less than 1.4 M. In further embodiments the concentration of the hydroxide-containing electrolyte is less than 1.3 M. In further embodiments the concentration of the hydroxide-containing electrolyte is less than 1.2 M. In further embodiments the concentration of the hydroxide-containing electrolyte is less than 1.1 M. In further embodiments the concentration of the hydroxide-containing electrolyte is less than 1.0 M. In further embodiments the concentration of the hydroxide-containing electrolyte is less than 0.9 M. In further embodiments the concentration of the hydroxide-containing electrolyte is less than 0.8 M. In further embodiments the concentration of the hydroxide-containing electrolyte is less than 0.7 M. In further embodiments the concentration of the hydroxide-containing electrolyte is less than 0.6 M. In further embodiments the concentration of the hydroxide-containing electrolyte is less than 0.5 M. In further embodiments the concentration of the hydroxide-containing electrolyte is less than 0.4 M. In further embodiments the concentration of the hydroxide-containing electrolyte is less than 0.3 M. In further embodiments the concentration of the hydroxide-containing electrolyte is less than 0.2 M. In further embodiments the concentration of the hydroxide-containing electrolyte is less than 0.1 M.

In some embodiments the $H_2$ generation became significant once the dehydrogenation cell voltage turned positive, with the generation rate increasing rapidly with the voltage. In some embodiments the faradaic efficiency of dehydrogenation is greater than 95%. In some embodiments the faradaic efficiency of dehydrogenation is greater than 96%. In some embodiments the faradaic efficiency of dehydrogenation is greater than 97%. In some embodiments the faradaic efficiency of dehydrogenation is greater than 98%. In some embodiments the faradaic efficiency of dehydrogenation is greater than 99%.

The systems and methods of the present invention include embodiments for dehydrogenating an amine into a corresponding nitrile coupled with an oxygen reduction reaction through electrochemical conversion using an electrochemical cell, which generates electricity.

In embodiments of the present invention for a system and method of dehydrogenating an amine into a corresponding nitrile coupled with an oxygen reduction reaction, also known as an electrical generation operation, the system includes an electrochemical cell including a cathode, an anode spaced apart from the cathode, an electrolyte to support electrochemical reactions at the cathode and the anode, a microporous separator located between the anode and the cathode, a conductive connection which electrically connects the cathode and the anode such that electrical energy generated by the electrochemical cell voltage and cell current may be used externally, an amine source configured to allow amine to contact the anode, and a oxygen source configured to allow oxygen to contact the cathode. During the electrical generation operation amine is oxidized via amine dehydrogenation in the present of hydroxide ions to produce a nitrile and electrons, and oxygen reduction reaction takes place in the presence of water to produce hydroxide ions and electrons to generate a cell voltage and cell current.

In embodiments of the present invention relating to an electrical generation operation, the amine source is an aqueous amine. In such embodiments, the amine source may include combining the aqueous amine with an aqueous electrolyte of the electrochemical cell.

In embodiments where the amine source is an aqueous amine, the concentration of the aqueous amine is greater than 0.1 M. In further embodiments, the concentration of the aqueous amine is greater than 0.2 M. In further embodiments, the concentration of the aqueous amine is greater than 0.3 M. In further embodiments, the concentration of the aqueous amine is greater than 0.4 M. In further embodiments, the concentration of the aqueous amine is greater than 0.5 M. In further embodiments, the concentration of the aqueous amine is greater than 0.6 M. In further embodiments, the concentration of the aqueous amine is greater than 0.7 M. In further embodiments, the concentration of the aqueous amine is greater than 0.8 M. In further embodiments, the concentration of the aqueous amine is greater than 0.9 M. In further embodiments, the concentration of the aqueous amine is greater than 1.0 M. In further embodiments, the concentration of the aqueous amine is greater than 1.1 M. In further embodiments, the concentration of the aqueous amine is greater than 1.2 M. In further embodiments, the concentration of the aqueous amine is greater than 1.3 M. In further embodiments, the concentration of the aqueous amine is greater than 1.4 M. In further embodiments, the concentration of the aqueous amine is greater than 1.5 M. In further embodiments, the concentration of the aqueous amine is greater than 1.6 M. In further embodiments, the concentration of the aqueous amine is greater than 1.7 M. In further embodiments, the concentration of the aqueous amine is greater than 1.8 M. In further embodiments, the concentration of the aqueous amine is greater than 1.9 M. In further embodiments, the concentration of the aqueous amine is greater than 2.0 M. In further embodiments, the concentration of the aqueous amine is greater than 3.0 M. In further embodiments, the concentration of the aqueous amine is greater than 4.0 M. In further embodiments, the concentration of the aqueous amine is greater than 5.0 M. In further embodiments, the concentration of the aqueous amine is greater than 6.0 M.

In embodiments where the amine source is an aqueous amine, the concentration of the aqueous amine is less than 6.0 M. In further embodiments, the concentration of the aqueous amine is less than 5.0 M. In further embodiments, the concentration of the aqueous amine is less than 4.0 M. In further embodiments, the concentration of the aqueous amine is less than 3.0 M. In further embodiments, the concentration of the aqueous amine is less than 2.0 M. In further embodiments, the concentration of the aqueous amine is less than 1.9 M. In further embodiments, the concentration of the aqueous amine is less than 1.8 M. In further embodiments, the concentration of the aqueous amine is less than 1.7 M. In further embodiments, the concentration of the aqueous amine is less than 1.6 M. In further embodiments, the concentration of the aqueous amine is less than 1.5 M. In further embodiments, the concentration of the aqueous amine is less than 1.4 M. In further embodiments, the concentration of the aqueous amine is less than 1.3 M. In further embodiments, the concentration of the aqueous amine is less than 1.2 M. In further embodiments, the concentration of the aqueous amine is less than 1.1 M. In further embodiments, the concentration of the aqueous amine is less than 1.0 M. In further embodiments, the concentration of the aqueous amine is less than 0.9 M. In further embodiments, the concentration of the aqueous amine is less than 0.8 M. In further embodiments, the concentration of the aqueous amine is less than 0.7 M. In further embodiments, the concentration of the aqueous amine is less than 0.6 M. In further embodiments, the concentration of the aqueous amine is less than 0.5 M. In further embodiments, the concentration of the aqueous amine is less than 0.4 M. In further embodiments, the concentration of the aqueous amine is less than 0.3 M. In further embodiments, the concentration of the aqueous amine is less than 0.2 M. In further embodiments, the concentration of the aqueous amine is less than 0.1 M.

The temperature was monitored by a thermocouple in the water bath between the range of the operating temperature between 20 to 60° C.

In light of the foregoing, it should be appreciated that the present invention significantly advances the art by providing an amine/nitrile redox couple for electrochemical conversion to releasably store hydrogen and operate as a fuel cell that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

The amine/nitrile redox couple systems and methods were studied in four different examples. Example One studied full cycle hydrogen release and storage using the amine/nitrile redox couple. Example Two studied dehydrogenation reactions. Example 3 studied intermediate products formed during dehydrogenation reactions. Example 4 included dehydrogenation fuel cell studies. Each example is detailed below.

Example One

An electrochemical cell was assembled using commercial platinum black (high surface area, 45 to 52 m$^2$/g) as a catalyst, Fumasep FAB-PK-130 as an anion exchange membrane, sigracet 22 BB (carbon paper) for electrode assembly. Each of these components were sourced from Fuel Cell Store. Ethylamine solution ($CH_3CH_2NH_2$, 66.0~72.0% in $H_2O$) and sodium hydroxide (NaOH, ACS reagent, ≥97%) were purchased from Sigma-Aldrich. Acetonitrile ($CH_3CN$, HiPerSolv, ≥97%) was purchased from VWR.

Examples of half-cell working electrodes were prepared prior to full cell assembly. A solution was prepared by mixing isopropanol with Nafion™ ionomer with a volume ratio of $V_{isopropanol}:V_{Nafion}$=250:1. The catalyst ink was obtained by dispersing 4 mg of commercial Pt black catalyst into 4 ml of the prepared solution (1 mg of catalyst/ml of solution). Then, the catalyst ink was sonicated for 15 to 30 mins until a dispersion was obtained. Then, 25 μl of catalyst ink was transferred dropwise onto a clean glassy carbon rotating disk electrode (RDE, 5 mm in diameter). A drop was added every 5 minutes to ensure complete solvent evaporation to obtain a homogeneous catalyst film. The final catalyst loading was 127.6 μg$_{Pt}$/cm$^2$.

A three-electrode system was used to perform electrochemical measurements of all half-cell reactions using a CHI 760D electrochemical workstation available from CH Instruments, Inc. The working electrode was a catalyst-coated rotating disk electrode. The counter electrode was a Pt wire. The reference electrode was an Ag/AgCl electrode available from CH Instruments, Inc. In performing a typical ethylamine dehydrogenation reaction, the electrolyte was an aqueous solution containing 1 M $CH_3CH_2NH_2$ and 1 M NaOH. The electrolyte was purged using argon for 20 mins before any measurement to remove trace amounts of dissolved air. After that, the electrochemical cell was completely sealed to prevent vapors from escaping due to the low boiling point of ethylamine, 16.6° C. Cyclic voltammogram (CV) was collected at a scanning rate of 50 mV/s. Linear sweep voltammetry (LSV) was conducted at a scanning rate of 10 mV/s. The liquid product was collected immediately after the reaction for nuclear magnetic resonance (NMR) characterizations. In a typical acetonitrile hydrogenation reaction, the electrolyte was an aqueous solution containing 1 M $CH_3CN$ and 1 M NaOH. The electrolyte was saturated with hydrogen to enable hydrogen oxidation reaction (HOR). Further experiments were conducted in a similar manner. The electrochemical tests at different temperatures were conducted by immersing the sealed electrochemical cell into an ice bath and the temperature was controlled between 0° C. to 20° C. All potentials were calibrated, converted and presented relative to reversible hydrogen electrode (RHE) according to Equation 1:

$$E \text{ (vs. RHE)} = E \text{ (vs. Ag/AgCl)} + 0.197 \text{ V} + 0.059 \times pH \quad (1)$$

The full cell was assembled as a 3.2 cm×3.2 cm anion exchange membrane (AEM) cell for hydrogen uptake and release tests. The membrane electrode assembly (MEA) used during the experiments consisted of a Pt anode, a PK reinforced AEM, available at Fuel Cell Store, and a Pt cathode. The AEM was treated with 1.0 M KOH solution to remove possible additives prior to use. To make both anode and cathode inks, commercial Pt black catalyst was mixed with an anion-exchange ionomer (polyaromatic polymer) with the ratio of 80:30 in dimethylformamide (DMF) solvent. The inks were sonicated for 30 mins to ensure dispersion. The inks were drop cast onto gas diffusion layers with an area of 10 cm$^2$ (5% PTFE treated carbon paper for gas diffusion and hydrophilic carbon cloth for liquid diffusion). The metal loading on both layers was 1 mg$_{Pt}$/cm$^2$. Finally, the pretreated membrane and electrodes with an area of 10 cm$^2$ were bonded together by the hot-pressing method to form the MEA.

The tests for hydrogen release (i.e., ethylamine dehydrogenation reaction coupled with hydrogen evolution reaction) were performed at room temperature under an $N_2$ gas flow of 100 ml/min on the cathode and an aqueous electrolyte (2 M ethylamine, 0.5 M NaOH) flow of 5 ml/min on the anode. The tests for hydrogen uptake (i.e., acetonitrile hydrogenation reaction coupled with hydrogen oxidation reaction) were performed at room temperature under an $H_2$ gas flow of 100 ml/min on the anode and an aqueous electrolyte (2 M acetonitrile, 0.5 M NaOH) flow of 5 ml/min on the cathode.

Nuclear magnetic resonance (NMR) was carried out on a research-grade 750 MHz Varian INOVA instrument. On-line mass spectrometry (MS) was conducted on a UGA Series Universal Gas Analyzer.

Techniques employing $^1$H-NMR were able to quantify the amounts of the liquid products from acetonitrile hydrogenation in hydrogen uptake experiments, with acetonitrile as the standard. The NMR samples were prepared in a mixture of D20 and collected liquid reaction product with a volume ratio of 80:20.

Mass spectroscopy was used to quantify the amount of hydrogen generated during ethylamine dehydrogenation in hydrogen release experiments. For on-line MS quantification, a calibration curve was plotted regarding the relationship between the hydrogen partial pressure (x) and change of hydrogen signal intensity (y) in MS, which was determined as equation 2:

$$y = 711.5x - 0.1378 \quad (2)$$

Then, instantaneous hydrogen generation rate (molar flow rate) was calculated by the following equation 3:

$$\dot{n} = \frac{P_{H2} * \dot{V}}{RT} \quad (3)$$

Here, $P_{H2}$ is the hydrogen partial pressure, V is the gas volumetric flow rate, R is the ideal gas constant, and T is temperature.

The faradaic efficiency was calculated based on the following equation 4:

$$F.E.(\%) = \frac{NF \int \dot{n} dt}{Q} \quad (4)$$

Here, N is the electron needed in the reaction to produce one hydrogen molecule, F is Faraday's constant, n is the hydrogen molar flow rate, and Q is the total charge transfer.

The electrochemical conversion between $CH_3CH_2NH_2$ and $CH_3CN$ in an alkaline aqueous electrolyte occurs via a four-electron transfer dehydrogenation and hydrogenation process and exhibits a standard redox potential of 0.13 V vs. RHE. The reaction properties were explored by conducting electrochemical measurements under half-cell test conditions, with the working electrode loaded with commercial Pt black catalyst for promoting the kinetics. Cyclic voltammetry and linear sweep voltammetry data collected in different electrolytes was plotted. In an 1M $CH_3CH_2NH_{2+1}$M NaOH electrolyte, the CV curve exhibited cathodic currents below 0 V, which corresponded to hydrogen evolution reaction (HER), and anodic currents above 0.32 V, which was attributed to $CH_3CH_2NH_2$ electrochemical oxidation because the anodic currents became negligible with the absence of $CH_3CH_2NH_2$ in the electrolyte. Proton nuclear magnetic resonance spectroscopy characterizations of the reacted solution found $CH_3CN$ to be the only liquid product, confirming effective, selective $CH_3CH_2NH_2$ dehydrogenation to $CH_3CN$. The measured low onset overpotential of about 0.19 V suggested fast dehydrogenation kinetics. An explanation for this is the moderate polarity and basicity of amine molecules, which would allow for efficient activation towards electrochemical oxidation. The occurrence of $CH_3CH_2NH_2$ dehydrogenation on the working electrode was accompanied by HER on the counter electrode, as evidenced by mass spectrometry detection of $H_2$ product in the gas phase.

The CV curve showed more significant cathodic currents below 0 V vs. RHE with the addition of $CH_3CN$ to the electrolyte. Moreover, there was a slight positive shift in the onset potential to 0.04 V. These results suggest the occurrence of $CH_3CN$ electrochemistry with an onset overpotential of 0.09 V, besides HER. $^1$H NMR spectrum of the reaction product showed $CH_3CH_2NH_2$ as a major product and minor fractions of $(CH_3CH_2)_2NH$ and $(CH_3CH_2)_3N$ side products. This result confirmed $CH_3CN$ can be effectively converted to $CH_3CH_2NH_2$ via electrochemical hydrogenation. It is worth noting that the $CH_3CN$ hydrogenation efficiency and selectivity can be further improved by catalyst research.

The effects of electrolyte pH and concentration on both $CH_3CH_2NH_2$ dehydrogenation and $CH_3CN$ hydrogenation reaction properties were investigated. The highest current density for $CH_3CH_2NH_2$ dehydrogenation was obtained with 0.5 M NaOH, suggesting the optimal pH for this reaction between 13.5 and 14.0. With an increase in the $CH_3CH_2NH_2$ concentration, there was an improvement in the dehydrogenation rate together with a suppression in HER. This can be explained by strong adsorption of amino groups to Pt catalyst with which a higher concentration of $CH_3CH_2NH_2$ would lead to more active sites being occupied for its dehydrogenation and less active sites for HER. Chronoamperometry experiments at 0.5 V vs. RHE revealed time dependency of the current density, which had a drastic decrease at the beginning and became more stabilized thereafter. The negligible influence of electrode rotation rate on the $CH_3CH_2NH_2$ dehydrogenation indicated minimal mass transfer limitation for this reaction under the studied conditions. For the reverse $CH_3CN$ hydrogenation reaction, a higher current density was obtained with an increase in the pH and a decrease in $CH_3CN$ concentration. Because $CH_3CN$ hydrogenation and HER occur simultaneously in the same potential region, there would be an interplay between the two processes that led to the observed changes. While the electrode rotation rate did not show a significant effect on the current density in $CH_3CN$ hydrogenation region, it considerably affected the current density in the positive potential range that corresponded to hydrogen oxidation reaction (HOR), particularly when the electrolyte was saturated with $H_2$. This was consistent with previous HOR studies and is attributed to a mass transfer limitation in this reaction.

The temperature effect on the two half-cell reactions were studied by measuring the LSV change with temperature, which was used for evaluating the reaction activity property. The obtained Arrhenius plot demonstrated an apparent activation energy (Ea) value of 52.4 kJ/mol at 0.5 V vs. RHE for $CH_3CH_2NH_2$ dehydrogenation and 11.6 kJ/mol at −0.05 V vs. RHE. Although the latter accounted for $CH_3CN$ hydrogenation with a mix of HER, these low Ea values revealed the rapid reaction kinetics correspond with the observed low overpotentials in $CH_3CH_2NH_2$ dehydrogenation and $CH_3CN$ hydrogenation. Benefiting from their low activation energy, a minimal increase in the potential difference between the two half-cell reactions is needed to drastically improve the reaction current density, implying feasibility of utilizing these two reactions to realize energy-efficient, complete cycle of hydrogen storage.

Figure 2:
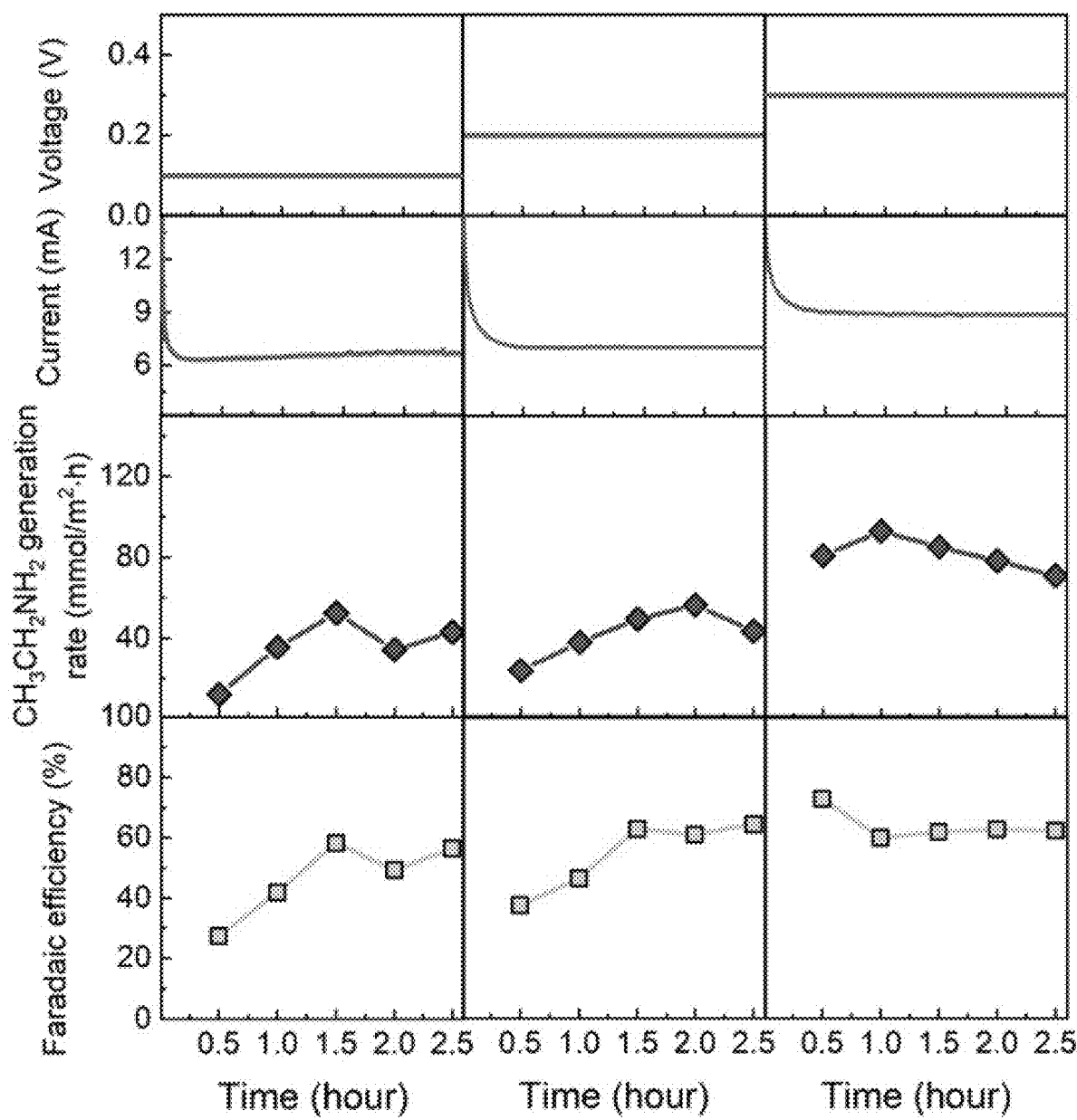
FIG. 2 provides plots of chronoamperometry results for an electrochemical cell at different voltages as well as corresponding $H_2$ uptake performance during hydrogenation.
Figure 3:
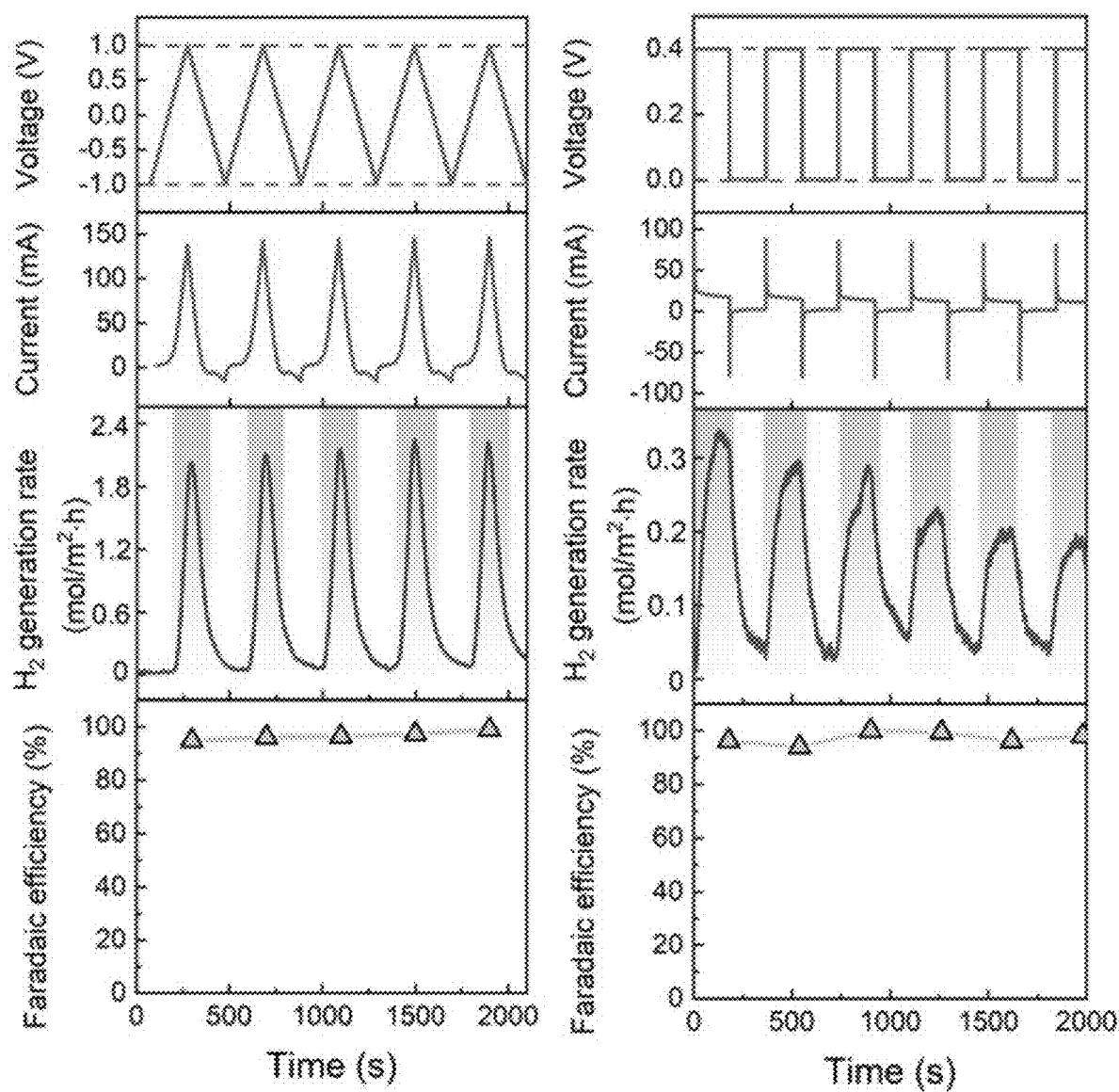
FIG. 3 provides CV and chronoamperometry results for an electrochemical cell and $H_2$ release during dehydrogenation.

The blueprint for a sustainable hydrogen economy includes electrolysis production of hydrogen which is stored through the electrochemical $CH_3CH_2NH_2/CH_3CN$ redox method to bridge hydrogen production and various applications. The overall hydrogenation/dehydrogenation process was carried out in a 10 cm$^2$ electrochemical cell to simulate a complete $H_2$ uptake/release cycle. In $H_2$ uptake experiments, $CH_3CN$ and $H_2$ were fed to the cathode and anode, at which $CH_3CN$ hydrogenation and HOR occurred with an applied cell voltage. FIG. 2 shows chronoamperometry tests of the cell at different voltages and the corresponding $H_2$ uptake performances. A notable current was measured even with a low cell voltage of 0.1 V. Except for the initial drop due to the capacitive current effect, the cell maintained a consistent current of roughly 6 mA throughout the experiment, indicating good durability for $CH_3CN$ hydrogenation and HOR reactions. An increase in the cell voltage led to enhancements in the $H_2$ uptake rate. This was evidenced by the measured current and the $CH_3CH_2NH_2$ generation rate quantified with NMR analysis, with $CH_3CH_2NH_2$ being produced at as high as 93.1 mmol/m$^2 \cdot$h rate at 0.3 V. With increasing cell voltage, the faradaic efficiency for $CH_3CH_2NH_2$ production gradually increased, reaching about 60% at 0.3 V. The non-superior $CH_3CH_2NH_2$ faradaic efficiency was caused by side reactions including HER and generation of $(CH_3CH_2)_2NH$ and $(CH_3CH_2)_3N$ minor products, which corresponds with the results under half-cell condition and can be improved by applying a more suitable catalyst. For $H_2$ release, $CH_3CH_2NH_2$ was fed to the anode and dehydrogenated to $CH_3CN$ with an applied cell voltage. This was coupled with HER at the cathode, transforming the hydrogen stored in $CH_3CH_2NH_2$ molecules to $H_2$ gas. FIG. 3 shows CV and chronoamperometry results of the cell, with $H_2$ generation being continuously measured using on-line mass spectroscopy. The $H_2$ generation became significant once the cell voltage turned positive, with the generation rate increasing rapidly with the voltage and the faradaic efficiency determined to be close to 100%. This was consistent with the finding of $CH_3CN$ as the only liquid product and $H_2$ as the only gas product, confirming an excellent selectivity in $H_2$ release via $CH_3CH_2NH_2$ dehydrogenation. The cell durability was evaluated by conducting chronoamperometry experiments at different voltages. The current showed a rapid drop in the first few minutes and then became steadier throughout the remaining experiment with a constant voltage being applied, suggesting promising cell durability. The current decayed more rapidly when the voltage was periodically turned on and off for simulating cell startup and shutdown operations, and the decay became more substantial as the voltage increased. This was likely due to a gradual deactivation of the Pt black catalyst under these stability test conditions. Regardless of the cell voltage, the faradaic efficiency was consistently greater than 94% and exhibited no signs of decrease.

An energy consumption analysis was conducted using the cell LSV data to assess the technical feasibility of this new electrochemical $CH_3CH_2NH_2/CH_3CN$ redox method for hydrogen storage application. The measured cell I-V plots during $H_2$ uptake and release processes as well as the calculated power consumption in the individual steps, based on which the total energy consumption to complete a hydrogen storage cycle at any designated hydrogen uptake and release rate were computed. It appeared that the energy consumption per mole of $H_2$ for a complete storage cycle was a function of $H_2$ uptake and release rate, with extremely low energy consumption at slow rates. For instance, the $H_2$ uptake and release at a rate of 1 L/m$^2 \cdot$h required only 52.5 kJ/mol energy consumption, which was dramatically smaller compared to 286 kJ/mol energy generation when the stored $H_2$ is combusted for application, suggesting the energy-efficient nature of the electrochemical $CH_3CH_2NH_2/CH_3CN$ redox method. The entire electrochemical $CH_3CH_2NH_2/CH_3CN$ redox method is capable of completing a hydrogen uptake and release cycle with 8.9 wt. % storage capacity under entirely ambient conditions. This new method is the only approach that meets the 2025 DOE onboard hydrogen storage target in terms of storage capacity ($\geq$5.5 wt. %), max delivery temperature ($\leq$85° C.), and max delivery pressure ($\leq$12 bar).

The $CH_3CH_2NH_2$ dehydrogenation to $CH_3CN$ using a commercial Pt black catalyst exhibited a low onset overpotential of 0.19 V, a moderate activation energy of 52.4 kJ/mol at 0.5 V vs. RHE, and produced $CH_3CN$ as the only product, indicating fast reaction kinetics and excellent selectivity. The rapid $CH_3CN$ hydrogenation to $CH_3CH_2NH_2$ was also evidenced by a low onset overpotential of 0.09 V and a low activation energy of 11.6 kJ/mol. A complete hydrogen uptake and release cycle was demonstrated with full cell testing, with 93.14 mmol/m$^2 \cdot$h $CH_3CH_2NH_2$ generation rate and 60% faradaic efficiency for $H_2$ uptake at 0.3 V cell voltage, and 0.34 mol/m$^2 \cdot$h $H_2$ generation rate and >94% faradaic efficiency for $H_2$ release at 0.4 V cell voltage. These results were obtained in a simply assembled electrochemical cell using commercial Pt black catalyst, implying the $H_2$ uptake and release rate as well as the faradaic efficiency can be further improved with cell engineering and new catalyst research. With 8.9 wt. % theoretical $H_2$ storage capacity, ambient reaction conditions, and 52.5 kJ/mol low energy consumption for $H_2$ uptake and release at a rate of 1 L/m$^2 \cdot$h, this study demonstrated the $CH_3CH_2NH_2/CH_3CN$ redox method as a viable hydrogen storage strategy that would contribute to advancing the hydrogen economy development.

Example Two

An electrochemical cell was assembled using commercial platinum black (20% Platinum on Carbon XC-72), a PK reinforced Anion Exchange Membrane (AEM) (Fumasep FAB-PK-130 available from Fuel Cell Store), and carbon cloth with a Microporous Layer (MPL) (W1S1009 available from Fuel Cell Store). Ethylamine solution ($CH_3CH_2NH_2$ 66.0-72.0% in $H_2O$) and potassium hydroxide were sourced from Sigma-Aldrich. Nafion (D521, 5%) was sourced from Fisher Scientific. Argon (Ar, 99.999%) was sourced from Praxair.

A catalyst ink was prepared for the three-electrode system by making a 1 mg/ml dispersion of $Pt_{20\%}/C$ in a mixture of solution (ethanol:water:Nafion® solution with a ratio of 200:300:1) after 30 minutes of sonication. 2 μg metal catalyst was dropped onto the working electrode and dried in a rotating mode.

Uniform anode and cathode inks were prepared for a full cell electrolyzer. A catalyst ink was mixed with an anion-exchange ionomer (10% in DMF) and 1-Methyl-2-pyrrolidinone (NMP) (Pt:ionomer with a ratio of 10:1). The catalyst ink was sonicated for 60 minutes and then drop-casted onto the carbon cloth. Both the membrane and membrane-less electrolyzer had a pt loading of 1 mg/cm$^2$.

A custom two-compartment electrolyzer that separates the cell by a microporous divider (0.1 microns) was used for membrane-less electrolysis experiments with pt/C coated on hydrophilic carbon cloth as both the cathode electrode and the anode electrode. For an electrolytic cell with a membrane, a custom two-compartment stacked flow cell electrolyzer separated by MEA assembly (pt/C coated on MPL carbon cloth for cathode and anode with AEM in between) was employed and the electrolyte tanks were connected to a peristaltic pump. The anolyte was 1 M KOH and 2 M ethylamine and the catholyte was 1 M KOH.

The three-electrode system comprised a 3 mm-diameter glassy carbon electrode as the working electrode, a platinum wire (diameter=0.3 mm) as the counter electrode, and an Ag/AgCl electrode as the reference electrode for current voltammetry measurements.

The measured working electrode potentials were calibrated and converted into the RHE scale according to Equation 1. All electrochemical measurements were obtained through a CHI1140 electrochemical workstation apparatus. Linear Sweep Voltammetry (LSV) was collected under Full cell electrolyzer and is corrected by current interrupt iR compensation.

The liquid products were analyzed by a Varian 750 MHz proton NMR ($^1$H-NMR) with pre-saturation water suppression optimization and formate serving as the internal standard (ISD). The gaseous products were analyzed by on-line mass spectrometry (MS) of the universal gas analyzer (UGA) with a high-vacuum chamber in real-time. Transient product generation on catalyst surface was examined in real-time by in situ attenuated total reflectance Fourier-transform infrared (ATR-FTIR) spectroscopy equipped using VeeMAX III Accessory. The Si window served as the current collector for the working electrode in addition to providing transparency to IR light.

The electrochemical behaviors of ethylamine dehydrogenation reaction (EDH) were first studied in a three-electrode system in 0.1 M KOH on Pt under various ethylamine concentrations. Cyclic voltammetry (CV) curves in showed a characteristic ethylamine oxidation (0.2 to 0.45 V vs. RHE) coupled with HER (−0.01 to −0.15 V vs. RHE) with 2 M ethylamine. EDH has a much lower onset potential of 0.2 V vs. RHE compared to OER of 1.8 V vs. RHE, indicating that ethylamine oxidation is a facile reaction and thermodynamically favorable. A −0.03 V vs. RHE onset potential for hydrogen evolution reaction (HER) was discovered which is comparable to the literature results. Thus, Pt possesses bifunctional catalysis efficiency for both HER and EDH. As anticipated, no current density increase was observed in the absence of ethylamine. Further analysis was focused on the EDH region from 0.2 to 0.45 V vs. RHE, where ethylamine loses four protons. In this region, three operation potentials were selected for the oxidation performance under various concentrations. The current density increases until reaching a maximum value with 2 M and 4 M ethylamine, then decreases as the concentration further increases. The attenuated performance at a higher concentration is limited by ethylamine solubility in the alkaline environment. Significant phase separation was detected under a high concentration of ethylamine in a strong base solution. An opposite tendency for reaction kinetics was observed. As concentration increased, the onset potential for EDH decreased. A higher concentration induces faster initial kinetics, but the reaction rate is impeded by its mass transfer effect due to the insolubility that may be responsible for the following slower electrochemical response. A high concentration of ethylamine also suppresses HER that a negative shift of onset potential is found under the concentration over 4 M. The overpotential between HER and EDH is independent from reactant concentration and maintains a low value of around 0.23 V. Based on these results, 2 M ethylamine alkaline solution seems to serve as the critical point for appropriate concentration and benefits for the intrinsic activity. This concentration was then used for stability test under half cell condition. The current density was maintained at around 9 mA/cm$^2$ after 20 cycle scans. Similar stability behavior over 20 scans was observed in a range of other concentrations.

Two electrolysis full cells with and without membrane were investigated to study the electrolysis technologies. For membrane-equipped cell, the Pt catalyst layer is tightly attached on each side of the AEM as the cathode and anode electrode. In the membrane-less full cell, the two electrodes are carefully set apart with a microporous separator. In general, the two different electrolysis cells share the same principles that ethylamine dehydrogenates to acetonitrile on the anode coupled with HER on the cathode under an applied potential. The polarization curves and the power supply of the electrolysis full cell with and without membrane at room temperature were generated. The membrane-less cell outperformed the membrane-based cell based upon lower energy consumption and a higher electrolysis efficiency. The negative full cell onset potential shifted from 0.41 V to 0.22 V when using a membrane-free cell, which indicates accelerated kinetics without a membrane. There is also a potential for a lower internal resistance without membrane shown. To reach a current density of 40 mA/cm$^2$, a 0.46 V is needed for a membrane-less cell whereas a 0.69 V is needed for membrane equipped cell, where the power supplies are the same as 5.17 mW/cm$^2$ for the two different cells. At a higher current density of 80 mA/cm$^2$, the corresponding cell voltage (0.67 V) and power supply (17.7 mW/cm$^2$) applied to the membrane-less cell is significantly lower than that of a membrane equipped cell with a corresponding cell voltage 0.92 V and power supply 19.9 mW/cm$^2$. This yielded a 12% efficiency improvement for the membrane-less cell compared to membrane electrolysis. The lesser performance of electrolysis cell with a membrane is probably due to the plasticizing effects on the ionically conducting polymer membranes. Ethylamine will induce membrane swelling and damage the integrity of the membrane in long-term operation.

The performance of the membrane-free electrolyzer was examined under different conditions. First, the effect of ethylamine concentration was studied in a range from 0 mole to 6 moles in 1 M KOH anolyte. The onset potential dramatically decreases to 0.23 V from 0 M to 2 M ethylamine, then it slightly increases when introducing more ethylamine to 6 M. This indicates the fastest kinetics for EDH under 2 M ethylamine, in addition, a 183 mA/cm$^2$ current density could be approachable at a relatively low cell voltage of 1 V. Predictably, complete disappearance of the anodic feature has been observed with 0 M ethylamine in the cell voltage from 0 V to 1 V because the electricity supply for EDH is far lower than the theoretically water electrolysis onset cell potential of 1.23 V. The obtained current density at 0.4 V, 0.6 V, and 0.8 V under various ethylamine concentrations was obtained. The highest current density is always obtained under 2 M ethylamine, which produced 22 mA/cm$^2$ (at 0.4 V), 75 mA/cm$^2$ (at 0.6 V), and 133 mA/cm$^2$ (at 0.8 V). Measuring the current density increment from 0 V to 1 V, 2 M ethylamine concentration also maintained the highest value, which is corresponded to its faster electrolysis rate. Therefore, it was determined that 2 M ethylamine makes the optimum conditions. The gradient PH value effect has been estimated with 2 M ethylamine. An extremely faint dehydrogenation reaction in a neutral electrolyte (0 M KOH) was observed with the current density slowly going to 2 mA/cm$^2$ at 0.8 V. The EDH performance largely improves with the pH increase until a saturated performance was found under 1 M KOH. The accumulation of hydroxide (OH$^-$) ions will help with the ionic conductivity when KOH concentration increases. Further increasing the KOH concentration from 1 M to 3 M does not lead to a rise in current density, and a slight decrease of cell performance was observed. The depreciate electrochemical behavior detected under higher ethylamine and KOH concentration may share similar reasons for a mass transfer issue discovered in the three-electrode cell. The blocked active sites are caused by intense oxidation reaction product, nitrite, under higher concentration which explains the depreciated performance. Accordingly, 2 M ethylamine and 1 M KOH was used to study the effect of temperature on EDH. Cell performance was improved by elevating the temperature from 276 K to 303 K due to the endothermic nature of EDH. Higher operation temperature is limited by the low boiling point of ethylamine. The measured activation energy (Ea) obtained from the Arrhenius plot was 34.1 kg/mol, 35.7 kg/mol, and 37.8 kg/mol at 0.8 V, 0.7 V, and 0.6 V, respectively. The calculated intrinsic energy required for electrocatalytic activity is lower than that of thermo-catalysis, indicating the superiority of the electrochemical method for EDH.

Product distributions of the membrane-less electrolysis cell under optimum conditions (2 M ethylamine and 1 M KOH anolyte) at room temperature with specific cell voltages were plotted. The hydrogen gas from the cathode was analyzed by on-line MS, while the anodic products were collected and quantified by $^1$H-NMR under optimum conditions of catholyte. A hydrogen formation rate of 5 μmol/h under a very low cell voltage of 0.3 V was observed. The hydrogen formation rate exhibits an exponential like increase from 0.3 V to 0.6 V. Increasing voltage beyond 0.6 V showed a lower rate of increase for hydrogen formation and relatively slow EDH product formation rate. The faradaic efficiency (FE) of FE$_{H2}$ maintained as high as over 85% in the voltage range of 0.3 V to 0.8 V and the maximum hydrogen formation rate during the study was 319 μmol/h at 0.8 V. For the anodic reaction, acetonitrile is the only product detected from 0.1 V to 0.6 V. An additional byproduct was observed at 0.8 V, which may include acetamide. The formation of amide might play a role in hydrogen production deceleration.

The current-time (i-t) curve was plotted at 0.7 V on Pt using 2 M ethylamine and 1 M KOH over 30 mins. A rapid decrease of the current density to 4 mA/cm$^2$ is observed. According to the in-situ ATR-FTIR analysis, peaks at 1510 cm$^{-1}$ (NH$_2$ $_{(ads)}$), 1450 cm$^{-1}$ (NH$^+$4), 840-980 cm$^{-1}$ (C—H$_{deformation}$), and 2966 cm$^{-1}$ (N—H$_{stretching}$) assigned to primary amine show stronger adsorption over time. This indicates a gradual generation of reaction intermediates that may be responsible for the decline of observed current. To confirm the influence of physisorption of the intermediates, a stability test with electrode negative sweep treatment was conducted. This included keeping the cell voltage negative at −0.7 V for 200 s after the cell voltage turning on (at 0.2 V to 1.0 V) for a certain of time to remove the generated intermediates. Negative sweep treatment was studied and the current retention as a function of time. An initial high current density can immediately recover within 30 minutes of operation once provided the negative sweep treatment. LSV curves from 0 V to 0.7 V after treatment for 5 cycles showed a 14% current density drop compared to 80% without treatment. This suggests negative sweep treatment greatly slows the deactivation of catalyst electrode. The FTIR spectrum of the typical N—H$_{stretching}$ peak was plotted for the first LSV cycle with subsequent treatment. The negative voltage treatment sweeps off the generated strongly adsorbed species on the catalyst electrode surface and frees those blocked active sites which reduces the performance degradation. The intensity of the absorbance recorded for 5 cycles shows a similar trend whereby it considerably increases as the reaction proceeds and decreases after the treatment started. The zigzag shape of intensity change implies a repeatable absorb and desorb of the intermediate species involved in the current recovery process. Over a longer time, the N—H peak intensity shows a decay behavior that the catalytic ability will eventually become inefficient due to the catalyst deactivation by imine contaminations.

A mild electrochemical method for EDH with hydrogen production at room temperature over the bifunctional Pt catalyst for the cathode and anode electrode was observed. The three-electrode half-cell characterization showed EDH possesses faster kinetics than OER, which shows the viability to combine EDH and HER with low energy consumption. Additionally, the ethylamine mass transfer effect due to the solubility ability plays a role in the EDH performance. Thus, with various ethylamine concentrations and pH values, the optimum conditions for EDH electrolysis are found under a specific composition of 1 M KOH and 2 M ethylamine anolyte. The maximum hydrogen formation rate can reach 319 μmol/h at a relatively lower cell voltage of 0.8 V with a minimal energy input of 9 mW/cm$^2$ under the optimum conditions in a membrane-less cell. The selectivity of EDH product can be precisely controlled by manipulating the cell voltage, where a 100% selectivity of acetonitrile can be achieved at an applied voltage lower than 0.8 V. For the cathode, the FE$_{H2}$ is always over 85% in the cell voltage range from 0 V to 1 V. The electrolysis efficiency decay was observed due to the strong physisorption of generated intermediates. The negative effects of the adsorbed intermediates were reduced by introducing a negative sweep treatment resulting in recovery of the decreased current density.

Example Three

In Example 2, a significant performance decrease was observed in terms of current density, which indicated a poising effect of the Pt catalyst surface. The EDR reaction is a 4-electron transfer process, and each step dehydrogenates one proton. Thus, partially dehydrogenated reaction intermediates may remain on the Pt surface. It was also found that the current density suffered significantly less from the cyclic voltammetry (CV) test than from the amperometry test. These results indicated different reaction dynamics and mechanisms. The reaction activity is highly dependent on the catalyst surface, which changes rapidly and constantly as the reaction is occurring. Example three includes in situ characterizations to capture the catalyst surface information in real time to study the reaction dynamics and the reaction mechanisms for EDH.

Ethylamine dehydrogenation reaction on Pt based catalyst was studied using attenuated total reflection infrared spectroscopy (ATR-IR). The reaction was studied under alkaline aqueous conductions in a three-electrode system in attenuated total reflection (ATR) mode. It was observed that some partially dehydrogenated reaction species were generated on Pt active site. These species strongly adsorbed on the Pt surface and were not able to be readily removed, which caused the blockage of the active site and prevented the further reaction. The Pt catalyst quickly deactivated especially under constant potentials for an extended period of time. The catalyst showed a self-cleaning property where the reaction intermediates could be hydrogenated back to ethylamine and released from the catalyst surface below 0 V vs RHE. A group of Pt—Ni catalyst was prepared for the ethylamine dehydrogenation reaction. Among them, $Pt_3Ni$ exhibited the highest activity, which corresponds to a 75% increase compared to Pt. ATR-IR results showed that $Pt_3Ni$ catalyst has a much slower intermediate generation rate than Pt catalyst.

The CV of pure Pt black catalyst in 1 M $CH_3CH_2NH_2$ and 1 M KOH solution for EDR was plotted. The CV curve exhibited a significant anodic current with an onset potential of 0.25 V vs RHE, which corresponded to EDR. The acetonitrile product was detected by proton nuclear magnetic resonance ($^1H$ NMR) spectroscopy (FIG. S1). The cathodic current below 0 V could be attributed to two reactions. One reaction was AHR where the small amount of acetonitrile near the catalyst surface generated during the anodic scan was hydrogenated back to ethylamine. Due to the limited amount of reactant in this reaction, the current was relatively low and convoluted with the more dramatic HER current.

The IR spectrum change from the solution of 1 M KOH to the solution of 1 M $CH_3CH_2NH_2$+1 M KOH was plotted. The two main peaks at 3350 $cm^{-1}$ and 1638 $cm^{-1}$ can be attributed to —OH stretching and —OH bending from water molecules, respectively. As the result of the addition of ethylamine, a few new peaks were observed at 2970 $cm^{-1}$, 2875 $cm^{-1}$, 1452 $cm^{-1}$, and 1385 $cm^{-1}$. The peaks at 2970 $cm^{-1}$ and 2875 $cm^{-1}$ can be assigned to C—H stretching from the —$CH_3$ group. The peaks at 1452 $cm^{-1}$, and 1385 $cm^{-1}$ can be assigned to N—H bending mode from the —$NH_2$ group. These observations indicated the spontaneous adsorption of ethylamine molecules on pure Pt surface. The ATR-IR spectra on Pt black catalyst for amperometry test at various potentials from 0.1 V to 0.9 V vs RHE was plotted. A fixed potential was used on the working electrode for 15 mins, and the ATR-IR spectra were recorded. The spontaneous adsorption of ethylamine occurred at open circuit potential, as shown by resulting minor peaks in ATR-IR. The signals due to ethylamine adsorption at open circuit potential were completely removed as background. This allowed for all following signals that were observed were due to the reaction intermediates that were newly formed on the Pt catalyst surface, as the result of the occurring dehydrogenation reaction. At 0.1 V vs RHE, the ATR-IR spectrum showed no visible signal after background removal, indicating that the Pt catalyst surface information hadn't been changed. As the potential was increased, the rise of five peaks were observed, which suggested that reaction species were formed and accumulated on the Pt surface. The peak at 2969 $cm^{-1}$ and 2875 $cm^{-1}$ can be assigned to —$CH_3$ stretching, and other three peaks at 1635 $cm^{-1}$, 1490 $cm^{-1}$, and 1395 $cm^{-1}$ can be assigned to —N—H bending mode. Noticeably, these peak positions were very similar to those attributed to ethylamine adsorption, which suggested the structural similarity between the newly formed species and ethylamine. It was found that the peaks at 1635 $cm^{-1}$, 1490 $cm^{-1}$, and 1395 $cm^{-1}$ have shifted to higher wave numbers and broadened significantly in comparation with the spectrum of ethylamine adsorption. The peak broadening was likely due to the intermolecular interactions being stronger, which indicates the instability of the —N—H bond. The peak shift towards a higher wave number indicates a higher electron density meaning a shorter bond length, which could be the result of a bond transformation from a single bond to a double bond, or even a triple bond. Based on those observations, the newly formed species on Pt surface were EDR intermediates, i.e. partially dehydrogenated amines, such as ethanimine ($CH_3CHNH$). The dehydrogenation may have caused the formation of some intermediates with irregular structures, such as $CH_3CNH_2$, $CH_3CH_2NH$, $CH_3CNH$, and $CH_3CHN$. The absorbance at 2969 $cm^{-1}$ was chosen as an indicator of the concentration of reaction intermediates on the Pt surface. The absorbance at 2969 $cm^{-1}$ increased as the potential increased, indicating the concentration of reaction intermediates increased as the potential increased. After the potential was applied on the electrode, the intermediates were being continuously generated and accumulated on the Pt surface as a function of time. The concentration of the intermediates stabilized after 8 minutes. A higher potential resulted in a higher intermediate concentration and also a higher accumulation rate indicated by the slopes of the IR spectra. At 0.5 V, the intermediate concentration was 70% of that at 0.9 V. At 0.35 V, the intermediate concentration was 50% of that at 0.9 V.

In situ ATR-IR spectroscopy was conducted to study the reaction dynamics of EDR on Pt catalyst. The IR spectra were collected while CV was being performed. The absorbance at 2969 $cm^{-1}$ increased quickly as the scan was swept positively from 0 V to 0.9 V in the first CV scan. It decreased as the scan was swept negatively from 0.9 V to 0 V but still retained about 60% of its maximum value. Throughout ten consecutive CV scans, the absorbance had rises and falls with the change of sweep direction but maintained a high level compared to the start of the run. This observation indicates that the reaction intermediates were generated and accumulated in positive scans, then partially released in negative scans. Importantly, the intermediates didn't release completely, thus the EDR became a self-poisoning process, and the remaining intermediates blocked the Pt catalyst active site for further reaction. As a result, the EDR current kept decreasing with each CV scan. Interestingly, when the CV scan range was expanded negatively to −0.3 V, the absorbance followed the trend with the direction of the CV scan but could be reduced to as low as the start value during negative scan, which suggests that the generated reaction intermediates on Pt surface could be removed completely, exhibiting a self-cleaning property. This led to the great stability of the Pt catalyst without significant activity decrease, and the current retention was 97% after 10 consecutive scans. This result was considerably higher than that of the 0 V to 0.9 V scan, which was only 83%. Reaction intermediates started to form as the CV is swept positively and the concentration of it reached its maximum at 0.9 V vs RHE, evidenced by the highest absorbance at 2969 $cm^{-1}$. With the change of scan direction, the concentration of the intermediates decreased slightly towards lower potentials. When the potential was swept in the hydrogen underpotential deposition region and hydrogen evolution reaction region, protons were deposited on the Pt catalyst surfaces, which would facilitate the intermediates being hydrogenated back to ethylamine. Therefore, in the lower potential range, the intermediate hydrogenation and the removal from the Pt surface were greatly promoted, which can be confirmed by the absorbance at 2969 $cm^{-1}$ disappearing at −0.2 V vs RHE.

The poisoning effect caused by the formation of reaction intermediates on Pt catalyst leads to a rapid performance decrease. In order to alleviate the poisoning effect, the adsorption energy between Pt and the intermediates should be lowered. Therefore, Pt—Ni alloy nanoparticles with various compositions were synthesized to improve the activity of EDR and the stability of the catalyst. $Pt_5Ni/C$, $Pt_3Ni/C$, and PtNi/C with metal loading of 20% were synthesized using a modified solid chemistry method. CV curves of $Pt_5Ni/C$, $Pt_3Ni/C$, PtNi/C and Pt/C electrocatalysts in 1 M $CH_3CH_2NH_{2+1}$ M KOH solution were generated. The current density was normalized to the surface area of Pt to evaluate the specific activity of the catalyst. Among these catalysts, the $Pt_3Ni/C$ alloy nanoparticle showed the highest EDR activity at 0.4 V, 0.45 V, and 0.5 V vs RHE. The $Pt_3Ni/C$ alloy nanoparticle exhibited an EDR activity of 1.2 $mA/cm^2_{Pt}$ at 0.5V vs RHE, which corresponded to an 80% activity increase compared to Pt/C. The relative absorbance of Pt/C and $Pt_3Ni/C$ catalyst for EDR was plotted. The slope for $Pt_3Ni/C$ catalyst was much smaller than that of the Pt/C, suggesting the intermediate formation and accumulation rate of $Pt_3Ni/C$ catalyst was decreased, consequently leading to the higher activity, which was consistent with the electrochemical results. There are two reasons why the intermediate formation rate was considerably lower. First, $Pt_3Ni$ has a lower d-band center compared to Pt, which causes the intermediates to bind weakly to the Pt surface. Second, The adsorption of the reaction intermediates requires multiple anchoring points. The incorporation of Ni atoms into the Pt lattice breaks the Pt ensembles. Therefore, the chance of intermediates finding abundant anchoring points is lower.

Example Four

Example four is directed towards fuel cell performance of the amine/nitrile redox couple. A catalyst ink was prepared by mixing catalyst 20% Pt/C on Vulcan XC-72 (obtained from Fuel Cell Store), 50% IPA/water solution, and ionomer. 5 mg catalyst was dispersed in 200 µL 50% IPA solution, and the ionomer was added into the mixture in a mass ratio of $m_{Pt}$:$m_{ionomer}$ at 7:3. The catalyst ink was then sonicated for 45 minutes to make a homogenous ink, and the container of the catalyst ink was shaken every 15 minutes. The mixture was then drop-casted uniformly on a 1 $cm^2$ carbon cloth (Panex 30, obtained from Fuel Cell Store) and pre-dried by a hot air blower until the IPA solution was evaporated. Finally, the electrode was dried in a vacuum oven at 70° C. for 12 hours. The electrode then had a metal loading of 1 $mg_{Pt}/cm^2$.

The working electrode prepared as above was secured to a Pt electrode clip and tested in a three-electrode system with Pt wire as the counter electrode and Ag/AgCl in 1M KCl (obtained from CH Instruments, Inc.) as the reference electrode. All the potentials mentioned in this example were calibrated to the reversible hydrogen electrode (RHE) as represented by Equation 1. The electrolyte was 1M KOH and 1M ethylamine as the normal concentration of ethylamine used in the half-cell reaction, while other concentrations of ethylamine were also used as the electrolyte in the tests investigating the influence of concentration. Cyclic voltammetry (CV) and Linear sweep voltammetry (LSV) were performed on a CHI 760D electrochemical workstation (available from CHI Instruments, Inc.), both with a scanning rate of 0.01 V/s. The product was collected after applying 0.4 V vs. RHE on the working electrode for 10 hours and characterized by proton nuclear magnetic resonance ($H^1NMR$). The obtained characterizations were compared with the reference $H^1NMR$ spectrum of acetonitrile to confirm the selectivity of ethylamine oxidation. The $H^1NMR$ test was carried out on a research-grade 2-channel Varian NMRS 500-01 instrument. Electrochemical impedance spectroscopy (EIS) was performed after the 10 hours ethylamine electrooxidation under 0.2 V and 0.3 V vs. RHE. During all the electrochemical tests, argon was used to purge the electrolyte so that the influence of dissolved air could be minimized.

A fuel cell was imitated by a two-compartment H-cell with glass frit in between to separate the anode and cathode. The catalyst was loaded on two pieces of carbon cloth separately and sandwiched with a pre-treated anion exchange membrane (AEM, Fumasep FAB-PK-130, available from Fuel Cell Store) between the catalyst layers. Then they were clipped between the two compartments of the H-cell to separate the ethylamine and oxygen. The catalyst for the anode was prepared according to drop-casting method, above. The cathode catalyst was instead loaded on double-sided carbon cloth (CeTech W1S1009, available from Fuel Cell Store), which has a hydrophilic side and a hydrophobic side. The cathode catalyst ink was prepared following the procedure of the anode catalyst ink and loaded on the hydrophilic side of the carbon cloth on 2 $cm^2$ area, with the hydrophobic side facing the flowing oxygen in the cathode. The loading of the 20% Pt/C on either side of the carbon cloth was optimized and maintained as 0.5 $mg_{Pt}/cm^2$ for the cathode. Oxygen was flowed through water into the cathode chamber, and an ethylamine aqueous solution was set in the anode chamber with argon purged during the tests. Higher temperature tests were performed by heating the H-cell by immersing the whole cell in the water bath heated by a hot plate. The temperature was monitored by a thermocouple in the water bath between the range of the operating temperature between 20 to 60° C.

To further explore the electrochemical property of ethylamine, the CV and EIS were carried out on a half cell. The onset potential for 1 M ethylamine converted to acetonitrile in 1 M KOH electrolyte was obtained by CV curve. The curve indicated a value of 0.18 V. The dehydrogenation potential window was between 0.18 V and 0.78 V, which avoids the overlap with OER activity. The half-reaction of the ethylamine/acetonitrile conversion through a four-electron reaction in alkaline proceeds as below:

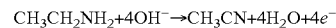

$CH_3CH_2NH_2+4OH^- \rightarrow CH_3CN+4H_2O+4e^-$

The low onset potential of the above reaction is contributed to by the strong steric effect of the substituent on the primary amine that benefits the radical cation of primary amine to access the surface binding sites. Another reason that may be attributed to the effective electrochemical oxidation is that the internal resistance of the ethylamine dehydrogenation fitted from the EIS results at 0.2 V and 0.3 V was only 1.0 ohm, which shows the efficient conversion. The resistance simulated from the equivalent circuit was not stable because the active reaction occurred at the potential range of dehydrogenation during the EIS test.

Proton NMR ($H^1NMR$) was used to confirm the reaction products after applying 0.4 V on 1 M ethylamine and 1 M KOH for 10 h for characterization. The $H^1NMR$ spectra exhibit the peaks of the reaction product where the chemical shifts at 1.04, 1.10, and 2.61 ppm were addressed to the ethylamine, and the single peak at 1.94 ppm was attributed to the desired product acetonitrile. There were no other side products detected from the $H^1NMR$, indicating a highly selective process ahead to acetonitrile.

In the two compartment H-cell, ethylamine is fed into the anode chamber, and humid oxygen flows through the cathode compartment, and the hydroxide ions generated from oxygen reduction reaction (ORR) are transported from cathode to anode through the gas diffusion layers and AEM. ORR is represented below:

$$O_2 + 2H_2O + 4e^- \rightarrow 4OH^-$$

The thermodynamic potential of ORR is about 1.23 V vs. RHE. The overall reaction in the cell is shown below:

$$CH_3CH_2NH_2 + O_2 \rightarrow CH_3CN + 2H_2O$$

Thus, the theoretical output of the ethylamine fuel cell is 1.05 V.

The effect of ethylamine concentration on the fuel cell performance was investigated under room temperature on several concentrations of ethylamine along with 1 M KOH. As shown in the LSV curves of these ethylamine half-cells, there is a clear trend that the current density increased with the ethylamine concentration. The peak of 4 M ethylamine shifted to left since the transport of hydroxide anion was no longer fast enough to satisfy the kinetics of the reaction, so that complete concentration polarization was achieved, and limit diffusion current was reached earlier. The limit current density should present a trend of exponential growth corresponding to the concentration of ethylamine, but the continuing consumption of hydroxide anions at the surface of the electrode at high concentration brings the critical potential forward to left. A higher concentration of ethylamine results in better power density performance due to the high current density they achieve, but the power density of 4 M ethylamine is low due to the mass transportation limit of the hydroxide ion. All the fuel cells had the open-circuit voltage with a value of approximately 1.0 V, which was slightly smaller than the ideal voltage of 1.05V, indicating the voltage loss caused by fuel crossover is minor. The rapid drop that occurred in the low current density area corresponding to the activation losses reveals that the Pt catalyst may not have enough effectiveness to overcome the activation energy at 25° C. Only a minority of increases occurred in power density corresponding to the concentration due to the mass transport limitation, and the peak current density fluctuated around 0.07 A/cm². Overall, the concentration of ethylamine is not a dominant factor in the performance of ethylamine fuel cells, as no significant difference was evident in the power density, cell voltage, and current density.

Electrochemical measurements were conducted to understand the effect of temperature on ethylamine fuel cell. First, the LSV tests were conducted on half-cell with 1 M ethylamine and 1 M KOH. At a low-temperature range of 20-40° C., the current density was not affected by temperature. This is due to the sluggish anode reaction resulting in the low performance at low temperatures. The Arrhenius plot of apparent activation energy (Ea) in ethylamine dehydrogenation at 0.2 V and 0.4 V showed a value of 26.90 and 20.97 kJ/mol, respectively, which is consistent with the low overpotential of ethylamine dehydrogenation. A Tafel plot illustrated the rate of the electrochemical reaction of the ethylamine dehydrogenation to the overpotential. The Tafel slopes were determined for 1 M ethylamine at 20, 30, and 40° C., which are 162.53, 159.56, and 156.44 mV/dec, respectively, indicating the tardy process in the low-temperature region. When the temperature rose to 60° C., the Tafel slope had a significant reduction with a value of 114.64 mV/dec. These results suggest that although the Ea obtained from the Arrhenius plot is lower than the oxidation of other fuels in AEMFCs, the dehydrogenation process is relatively slow at low temperatures according to Tafel plots due to the energy barrier. In order to further explore the temperature effect on ethylamine fuel cells, the power density and i-V curve measured on fuel cells with 1 M ethylamine and 1 M KOH at different temperatures were compared. It is no doubt that the ethylamine fuel cell exhibited the best performance under 60° C. due to the high current density of both ethylamine half-cell and ORR half-reaction at high temperatures. According to the polarization curve, the activation loss voltage in the 60° C. ethylamine fuel cell was 0.26 V, while the activation loss for the other three fuel cells was ~0.39 V, which agreed well with the Tafel slopes. The power density of ethylamine was improved with the increasing temperature. The peak power density of the fuel cell at 60° C. had a value of 37.39 mW/cm², which was 3.75 times higher than that of the ethylamine fuel cell at 20° C. and 2.28-fold than that of 40° C. ethylamine fuel cell. The current density and power density remained stable under low temperatures as 20 and 30° C., with the value of approximately 0.07 A/cm² and 10.00 mW/cm², respectively. Under relatively high working temperature at 60° C., the activation loss is reduced due to the assistance of the high operating temperature, and the power density is increased along with the current density due to faster electrochemical reaction.

Although the electrochemical oxidation of ethylamine at room temperature is relatively slack compared to itself at the higher temperature, the output of the ethylamine fuel cell at room temperature is significantly larger than other fuel cells with the same condition. Peak power density and operating temperature of methanol, ethanol, and urea fuel cell were compared with the ethylamine fuel cell. The ethanol and methanol fuel cells achieved high power densities under working temperatures between 60 to 80° C., which is competitive with the PEMFCs. The drawback of the methanol and ethanol fuel cells is that they cannot be performed under ambient condition due to the high activation energy of the anode reaction. In contrast, our ethylamine fuel cell is able to operate from 20 to 60° C., and the peak power density is 7.41 times higher than that of the direct urea fuel cell at 20° C. The ethylamine fuel cell exhibits stronger performance when compared with ethanol and methanol fuel cells which are not applicable at room temperature as well as urea fuel cell, which fails to achieve decent power density. The ethylamine cell shows promising application with ethylamine fuel cells in electrical vehicles. The regenerative characteristic of ethylamine makes it possible to reuse the acetonitrile to ethylamine with the rehydrogenation procedure, and the high capacity of ethylamine as a liquid is also friendly for electrical vehicles to refuel at a gas station.

The ethylamine fuel cell operates based upon the anodic oxidation of ethylamine to acetonitrile and ORR as the cathode reaction. An ethylamine fuel cell was assembled, and the concentration and temperature effects were investigated. The 1 M ethylamine fuel cell achieved a power density of 9.98 mW/cm² and that of 4 M ethylamine increased by only 17.03%, revealing the concentration is not the main impact on the ethylamine fuel cell performance. The temperature is observed to be the dominant effect on ethylamine fuel cell, resulting in 37.39 mW/cm² in power density of ethylamine fuel cell at 60° C. The activation energy of ethylamine dehydrogenation is relatively low at 20.97 kJ/mol, but the Pt catalyst is a drawback due to the insufficient effectiveness and poisoning indicated by the high activation loss in cell voltage. The ethylamine fuel cell displays enormous potential in future applications since the simple electrochemical rehydrogenation of acetonitrile makes the ethylamine fuel cell the first fuel cell with regenerative fuel, and the low working temperature is also contributed to the fuel cell operating more easily.

What is claimed is:

1. A method of operating an electrochemical cell to releasably store hydrogen, the electrochemical cell comprising a cathode, an anode, a microporous separator, an electrolyte, and the method comprising:
hydrogenating a nitrile to releasably store hydrogen by:
feeding hydrogen to the anode;
feeding the nitrile to the cathode; and
applying a hydrogenation cell voltage to the electrochemical cell such that the hydrogen is oxidized via a hydrogen oxidation reaction at the anode and consumed to hydrogenate the nitrile to thereby store the hydrogen in a hydrogenation product amine.

2. The method of claim 1, further comprising:
dehydrogenating an amine to release hydrogen, wherein the amine may comprise the hydrogenation product amine, and wherein the step of dehydrogenating the amine further comprises:
feeding the amine to the anode;
applying a dehydrogenation cell voltage to the electrochemical cell such that the amine is converted to a generated nitrile at the anode and hydrogen is released via a hydrogen evolution reaction at the cathode.

3. The method of claim 2, wherein operating the electrochemical cell takes place at a temperature of from 0° C. to 100° C.

4. The method of claim 2, wherein operating the electrochemical cell takes place at a pressure of from 0.1 bar to 10 bar.

5. The method of claim 1, wherein the electrolyte is an alkaline aqueous electrolyte.

6. The method of claim 1, wherein the step of feeding hydrogen to the anode comprises supplying hydrogen gas to the anode.

7. The method of claim 1, wherein the step of feeding the nitrile to the cathode comprises feeding the nitrile in the form of gas, liquid, or an aqueous solution of the nitrile.

8. The method of claim 2, wherein the step of feeding the amine to the anode comprises feeding the amine in form of gas, liquid, or an aqueous solution of the amine.

9. The method of claim 2, wherein the electrochemical cell is operated within a stack of multiple electrochemical cells capable of releasably storing hydrogen.

* * * * *